United States Patent
Kim et al.

(10) Patent No.: US 11,422,678 B2
(45) Date of Patent: Aug. 23, 2022

(54) METHOD AND DEVICE FOR MANAGING TAB WINDOW INDICATING APPLICATION GROUP INCLUDING HETEROGENEOUS APPLICATIONS

(71) Applicant: Samsung Electronics Co., Ltd., Suwon-si (KR)

(72) Inventors: Doo-hwan Kim, Suwon-si (KR); Kang-tae Kim, Seongnam-si (KR); Chul-joo Kim, Suwon-si (KR); Tae-soo Kim, Suwon-si (KR); Young-seok Lee, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/905,265

(22) Filed: Jun. 18, 2020

(65) Prior Publication Data

US 2020/0319763 A1 Oct. 8, 2020

Related U.S. Application Data

(63) Continuation of application No. 14/994,883, filed on Jan. 13, 2016, now Pat. No. 10,705,687, which is a
(Continued)

(30) Foreign Application Priority Data

Aug. 2, 2013 (KR) .......................... 10-2013-0092240

(51) Int. Cl.
*G06F 3/048* (2013.01)
*G06F 9/451* (2018.01)
(Continued)

(52) U.S. Cl.
CPC .......... *G06F 3/0483* (2013.01); *G06F 3/0482* (2013.01); *G06F 3/0486* (2013.01);
(Continued)

(58) Field of Classification Search
CPC .......... G06F 3/00; G06F 3/048; G06F 3/0483; G06F 9/451; G06F 3/0482;
(Continued)

(56) References Cited

U.S. PATENT DOCUMENTS

| | | | | |
|---|---|---|---|---|
| 5,917,483 A | * | 6/1999 | Duncan | G06F 3/0481 715/788 |
| 6,037,939 A | * | 3/2000 | Kashiwagi | G06F 3/04845 715/767 |

(Continued)

FOREIGN PATENT DOCUMENTS

| | | |
|---|---|---|
| CN | 102754353 A | 10/2012 |
| EP | 2 595 043 A2 | 5/2013 |

(Continued)

OTHER PUBLICATIONS

Korean Office Action dated Mar. 16, 2020, issued in Korean Application No. 10-2013-0092240.
(Continued)

*Primary Examiner* — Hugo Molina
(74) *Attorney, Agent, or Firm* — Jefferson IP Law, LLP

(57) ABSTRACT

A method and a device for managing a tab window indicating a group including heterogeneous applications. The method includes outputting a display window comprising at least one or more objects for executing one or more applications on a terminal window, receiving a user input that selects the at least one or more objects and moves the selected at least one or more objects to a region excluding the display window, generating an application group comprising at least one or more applications corresponding to the selected at least one or more objects according to the received user input, and outputting a tab window indicating the generated application group to the terminal window.

20 Claims, 36 Drawing Sheets

Related U.S. Application Data continuation of application No. PCT/KR2014/006538, filed on Jul. 18, 2014.

(51) Int. Cl.
  *G06F 3/0483* (2013.01)
  *G06F 3/0482* (2013.01)
  *G06F 3/04842* (2022.01)
  *G06F 3/04845* (2022.01)
  *G06F 3/0486* (2013.01)

(52) U.S. Cl.
  CPC ...... *G06F 3/04842* (2013.01); *G06F 3/04845* (2013.01); *G06F 9/451* (2018.02); *G06F 2203/04803* (2013.01)

(58) Field of Classification Search
  CPC ............ G06F 3/04842; G06F 3/04845; G06F 3/0486; G06F 2203/04803
  See application file for complete search history.

(56) References Cited

U.S. PATENT DOCUMENTS

| | | | |
|---|---|---|---|
| 6,166,736 A | 12/2000 | Hugh | |
| 6,756,999 B2 | 6/2004 | Stoakley et al. | |
| 7,124,373 B1 | 10/2006 | Patil | |
| 7,523,409 B2 | 4/2009 | Yolleck et al. | |
| 7,921,365 B2 | 4/2011 | Sauve et al. | |
| 2003/0076340 A1* | 4/2003 | Hatori | G09G 5/14 345/699 |
| 2004/0066414 A1 | 4/2004 | Czerwinski et al. | |
| 2005/0181878 A1* | 8/2005 | Danieli | A63F 13/215 463/42 |
| 2006/0020538 A1 | 1/2006 | Ram | |
| 2006/0069635 A1* | 3/2006 | Ram | G06Q 30/08 705/37 |
| 2006/0107303 A1* | 5/2006 | Erhart | H04N 7/147 725/135 |
| 2006/0161859 A1* | 7/2006 | Holecek | G06F 3/048 715/781 |
| 2006/0184537 A1 | 8/2006 | Sauve et al. | |
| 2006/0206834 A1* | 9/2006 | Fisher | G06F 16/24575 |
| 2006/0248471 A1 | 11/2006 | Lindsay et al. | |
| 2008/0115064 A1* | 5/2008 | Roach | G06F 3/04897 715/730 |
| 2009/0138818 A1* | 5/2009 | Nemoto | G06F 3/048 715/790 |
| 2009/0144648 A1 | 6/2009 | Oskooi | |
| 2010/0107115 A1 | 4/2010 | Sareen et al. | |
| 2011/0022955 A1* | 1/2011 | Gilfix | G06F 8/36 715/702 |
| 2011/0060988 A1 | 3/2011 | Mysliwy et al. | |
| 2011/0144970 A1* | 6/2011 | Jiang | G06F 3/14 703/24 |
| 2011/0173556 A1 | 7/2011 | Czerwinski et al. | |
| 2011/0179375 A1 | 7/2011 | Shupp et al. | |
| 2011/0197155 A1 | 8/2011 | Lee et al. | |
| 2011/0225522 A1* | 9/2011 | Kamiyama | G06F 9/451 715/762 |
| 2012/0066628 A1* | 3/2012 | Ens | G06F 16/9577 715/769 |
| 2012/0159395 A1 | 6/2012 | Deutsch et al. | |
| 2012/0304229 A1* | 11/2012 | Choi | H04N 21/8173 725/41 |
| 2013/0014048 A1 | 1/2013 | Satterfield et al. | |
| 2013/0120447 A1 | 5/2013 | Kim et al. | |
| 2013/0135342 A1 | 5/2013 | Kang | |
| 2013/0167078 A1 | 6/2013 | Monnig | |
| 2013/0268837 A1 | 10/2013 | Braithwaite et al. | |
| 2013/0297050 A1* | 11/2013 | Reichard | G05B 15/02 700/83 |
| 2014/0053097 A1* | 2/2014 | Shin | G06F 3/04883 715/779 |
| 2014/0075373 A1 | 3/2014 | Jitkoff et al. | |
| 2014/0096051 A1* | 4/2014 | Boblett | B60G 17/015 715/769 |
| 2014/0149931 A1* | 5/2014 | Miki | G06F 3/0481 715/803 |
| 2014/0157183 A1 | 6/2014 | Dorsay et al. | |
| 2014/0195926 A1* | 7/2014 | Hussain | G06F 3/0488 715/750 |
| 2014/0337794 A1* | 11/2014 | Vranjes | G06F 3/0481 715/800 |
| 2015/0205775 A1* | 7/2015 | Berdahl | G06F 3/0481 715/255 |
| 2019/0163347 A1 | 5/2019 | Yook et al. | |

FOREIGN PATENT DOCUMENTS

| | | |
|---|---|---|
| JP | 2003-526820 A | 9/2003 |
| KR | 10-2010-0107377 A | 10/2010 |
| KR | 10-2012-0033789 A | 4/2012 |
| KR | 10-2012-0139956 A | 12/2012 |
| KR | 10-2013-0054071 A | 5/2013 |
| KR | 10-2013-0057588 A | 6/2013 |
| WO | 2011/099720 A2 | 8/2011 |

OTHER PUBLICATIONS

Chinese Office Action dated Jul. 31,2 018, issued in Chinese Patent Application No. 201480043824.5.

Korean Office Action dated Sep. 3, 2020, issued in Korean Application No. 10-2013-0092240.

* cited by examiner

FIG. 3A
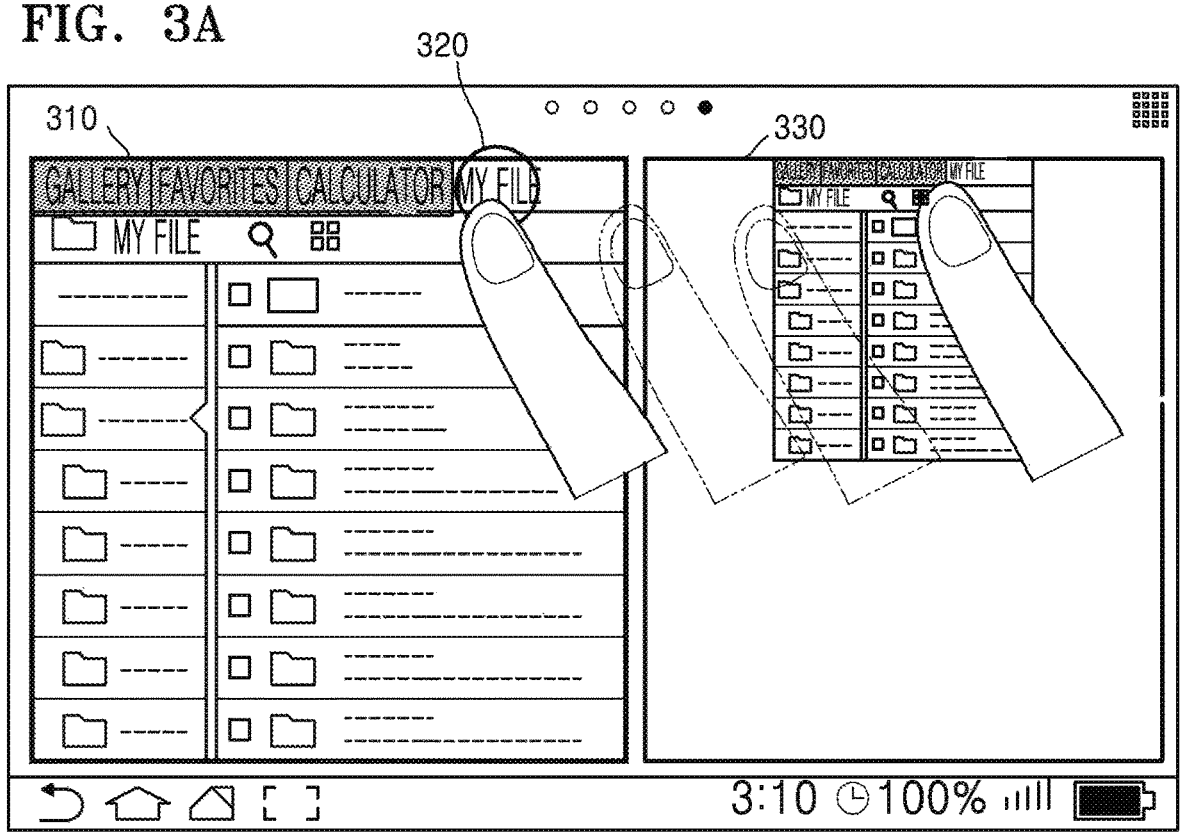
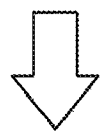
Tab Button Drag & Drop
FIG. 3B
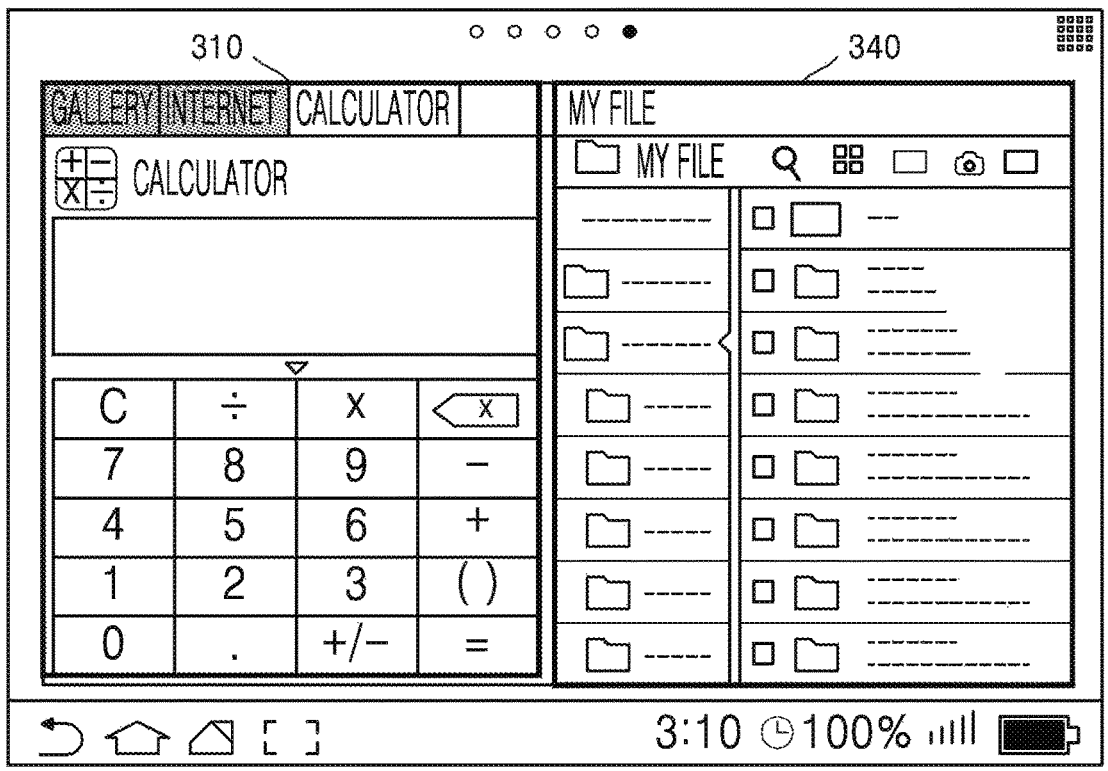

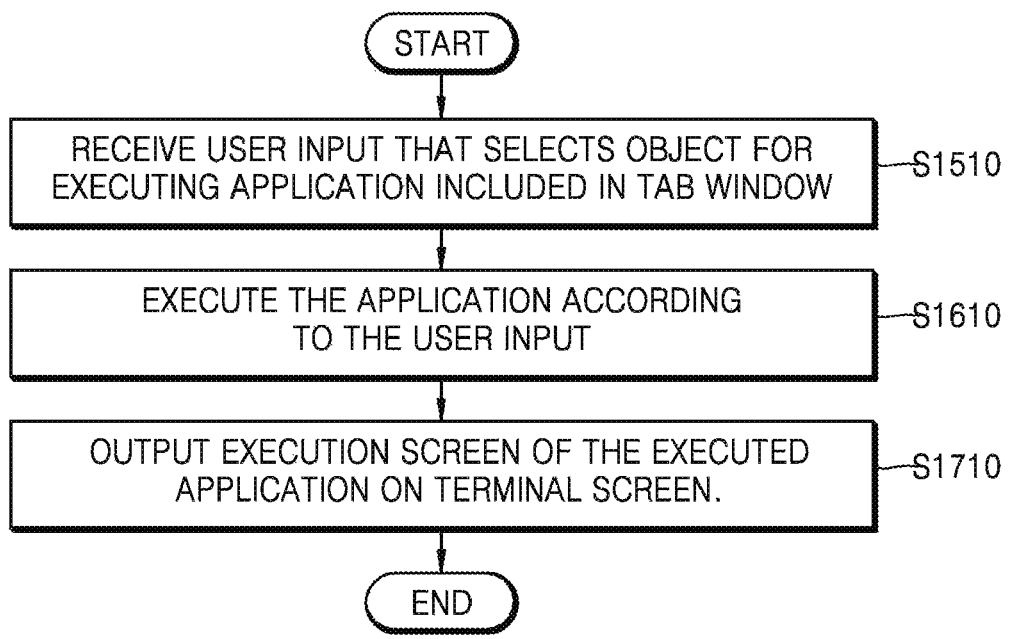

FIG. 9A
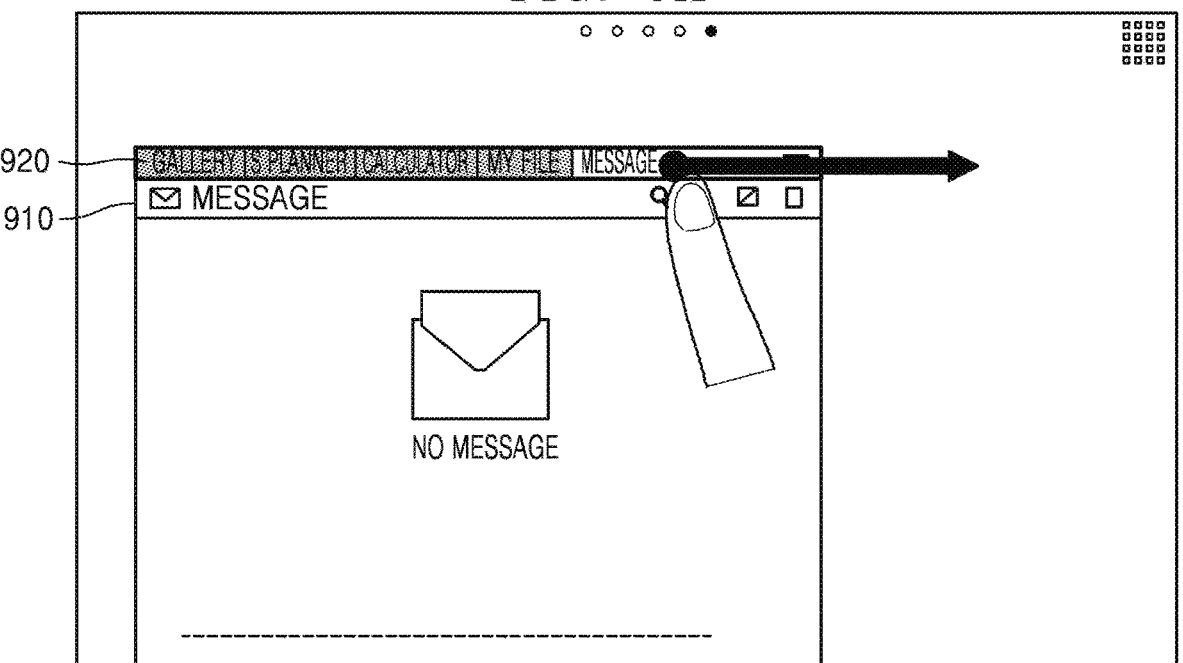
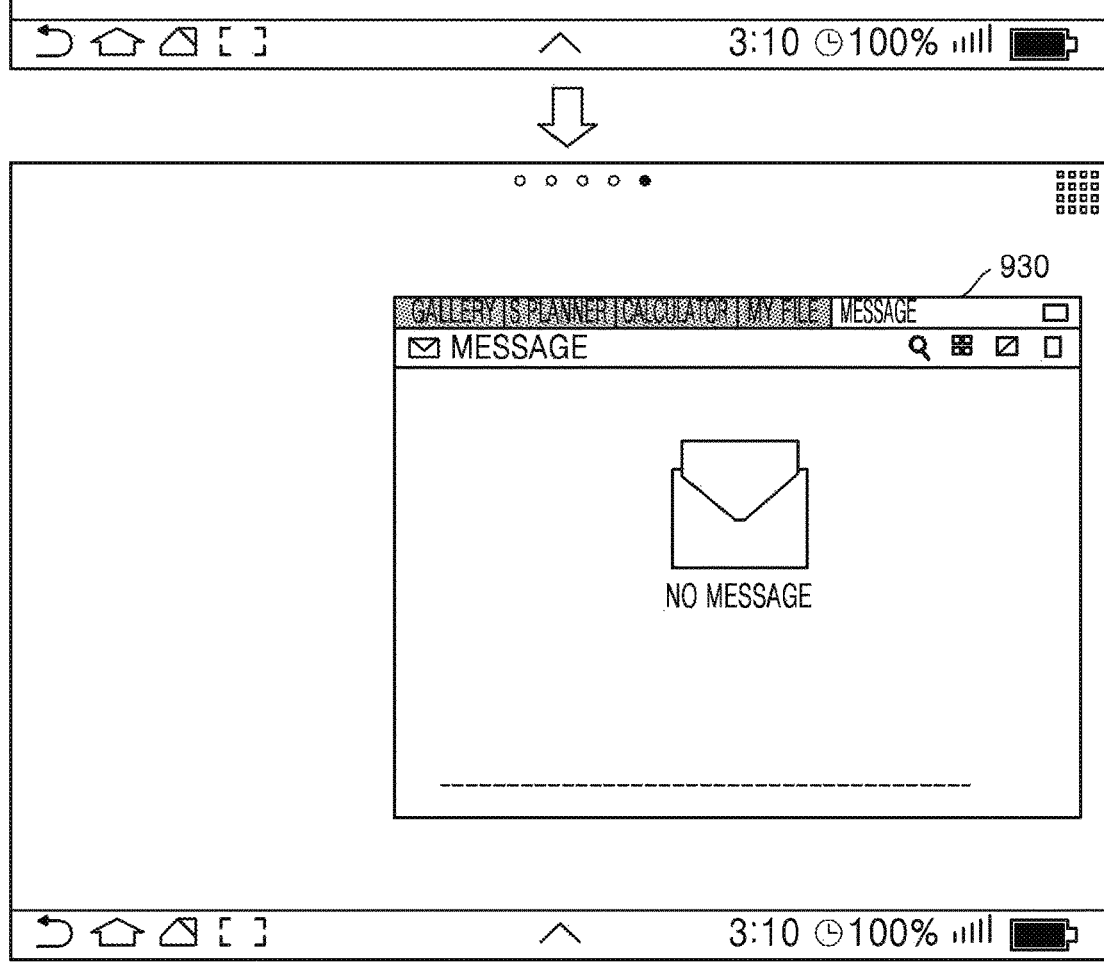

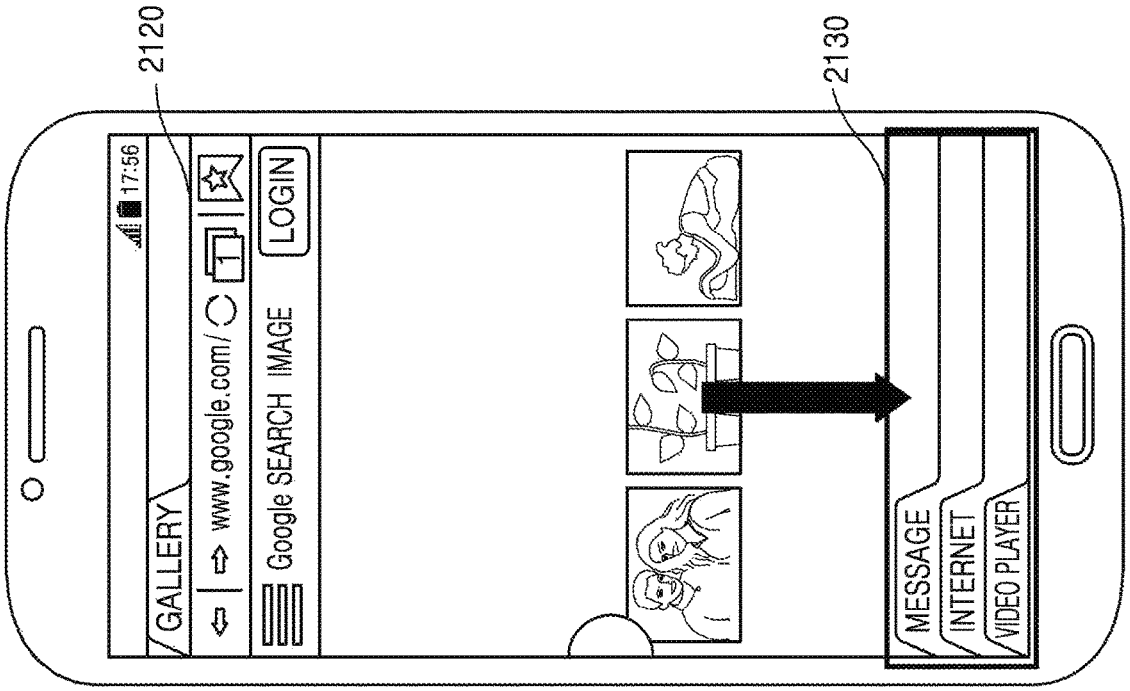
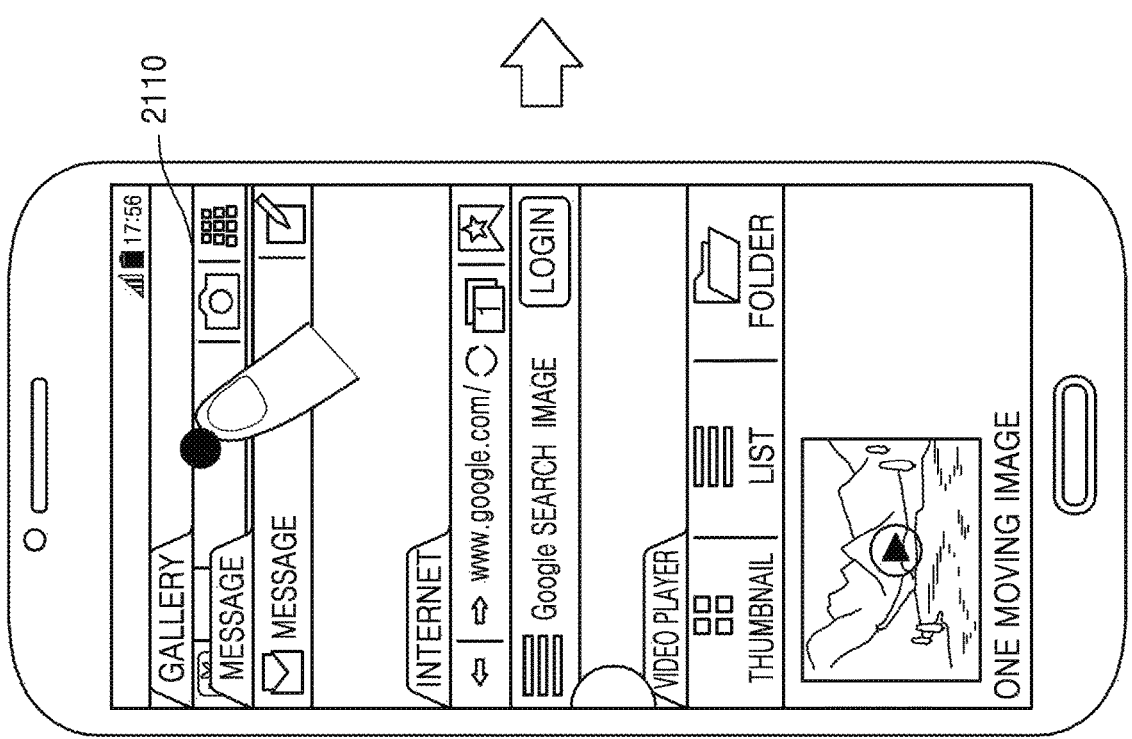

METHOD AND DEVICE FOR MANAGING TAB WINDOW INDICATING APPLICATION GROUP INCLUDING HETEROGENEOUS APPLICATIONS

CROSS-REFERENCE TO RELATED APPLICATION(S)

This application is a continuation application of prior application Ser. No. 14/994,883, filed on Jan. 13, 2016, which has issued as U.S. Pat. No. 10,705,689 on Jul. 7, 2020 and is a continuation of an International application number PCT/KR2014/006538 filed on Jul. 18, 2014, which claimed the benefit of a Korean patent application number 10-2013-0092240 filed on Aug. 2, 2013 in the Korean Intellectual Property, the entire disclosure of each of which is hereby incorporated by reference.

TECHNICAL FIELD

The present disclosure relates to a method and device for managing a tab window indicating a group including heterogeneous applications.

BACKGROUND

In general, a touch screen refers to a screen capable of receiving a touch input. The touch screen may perform a function of receiving the touch input by adding a touch panel to a display, and may be utilized in various ways owing to its convenience of use. As a central processing unit (CPU), a memory, and a display device are developed, a multi-window environment in which a terminal including the touch screen may simultaneously execute a plurality of applications has become more common.

However, a size of a terminal screen is limited, and the terminal manages an execution screen of an application in a window unit, which may deteriorate readability of the terminal when the plurality of applications are executed. When the plurality of applications are executed, a user may have difficulty in individually controlling the plurality of applications.

Therefore, when the plurality of applications installed in the terminal are executed, there is a demand for a technology for effectively managing windows of the executed applications.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and device for managing a tab window indicating a group including heterogeneous applications.

Another aspect of the present disclosure is to provide a non-transitory computer-readable recording medium having recorded thereon a program for executing the method.

Additional aspects will be set forth in part in the description which follows and, in part, will be apparent from the description, or may be learned by practice of the presented embodiments.

In accordance with an aspect of the present disclosure, a method of managing a tab window is provided. The method includes outputting a display window including at least one or more objects for executing one or more applications on a terminal window, receiving a user input that selects the at least one or more objects and moves the selected at least one or more objects to a region excluding the display window, generating an application group including at least one or more applications corresponding to the selected at least one or more objects according to the received user input, and outputting a tab window indicating the generated application group to the terminal window.

In accordance with another aspect of the present disclosure, a device for managing a tab window is provided. The device includes an input unit configured to receive a user input that selects at least one or more objects for executing at least one or more applications and to move the selected at least one or more objects to a region excluding a display window, a group generating unit configured to generate an application group including applications corresponding to the selected object according to the received user input, and an output unit configured to output a display window including at least one or more objects and to output a tab window indicating the generated application group.

In accordance with another aspect of the present disclosure, a method of managing a tab window is provided. The method includes selecting at least one or more applications from applications installed in a terminal, generating a group including the selected at least one or more applications, determining a layout of a tab window indicating the generated group, and storing information regarding the generated group based on the selected at least one or more applications and the determined layout.

In accordance with another aspect of the present disclosure, a device for managing a tab window is provided. The device includes a group generating unit configured to select at least one or more applications from applications installed in a terminal and to generate a group including the selected at least one or more applications, a frame changing unit configured to determine a layout of a tab window indicating the generated group, and a storage unit configured to store information regarding the generated group based on the selected at least one or more applications and the determined layout.

In accordance with another aspect of the present disclosure, a non-transitory computer-readable storage medium storing a computer program for executing the method described above is provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 3A and 3B illustrate other examples in which a device generates tab windows and displays the tab windows on a terminal screen according to various embodiments of the present disclosure;

FIG. 6 is a flowchart of another example of a method of managing a tab window according to an embodiment of the present disclosure;

FIGS. 9A to 9C illustrate examples in which a device displays changed tab windows on a terminal screen according to various embodiments of the present disclosure;

FIGS. 21A and 21B illustrate examples in which a device manages a tab window in a card view form based on a user input of a long touch gesture according to various embodiments of the present disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It will be understood that when an element is referred to as being "connected" to another element, it may be "directly connected" to the other element or may be "electrically connected" to the other element with other element(s) interposed therebetween. It will also be understood that the terms "comprises", "includes", and "has", when used herein, specify the presence of stated elements, but do not preclude the presence or addition of other elements, unless otherwise defined.

Throughout the specification, a term "gesture" refers to a user's action used to control a terminal. For example, a gesture described in the specification includes tap, touch and hole, double tap, drag, panning, flick, drag and drop, hand shaking, etc.

Throughout the specification, a "device" refers to an element that is included in a terminal and implements a predetermined objective. In this regard, the terminal may include a mobile terminal including a smartphone but is not limited thereto. In more detail, the terminal may be included in various embodiments of the present disclosure as long as the terminal is an object that includes a screen capable of display and an interface that may receive input information from a user, receives a user input, and implements the predetermined objective.

Throughout the specification, "outputting of a screen of a device" means displaying of a specific screen on the screen of the device. Thus, "outputting of a screen of a device" includes "displaying of a screen of a device".

Figure 1:
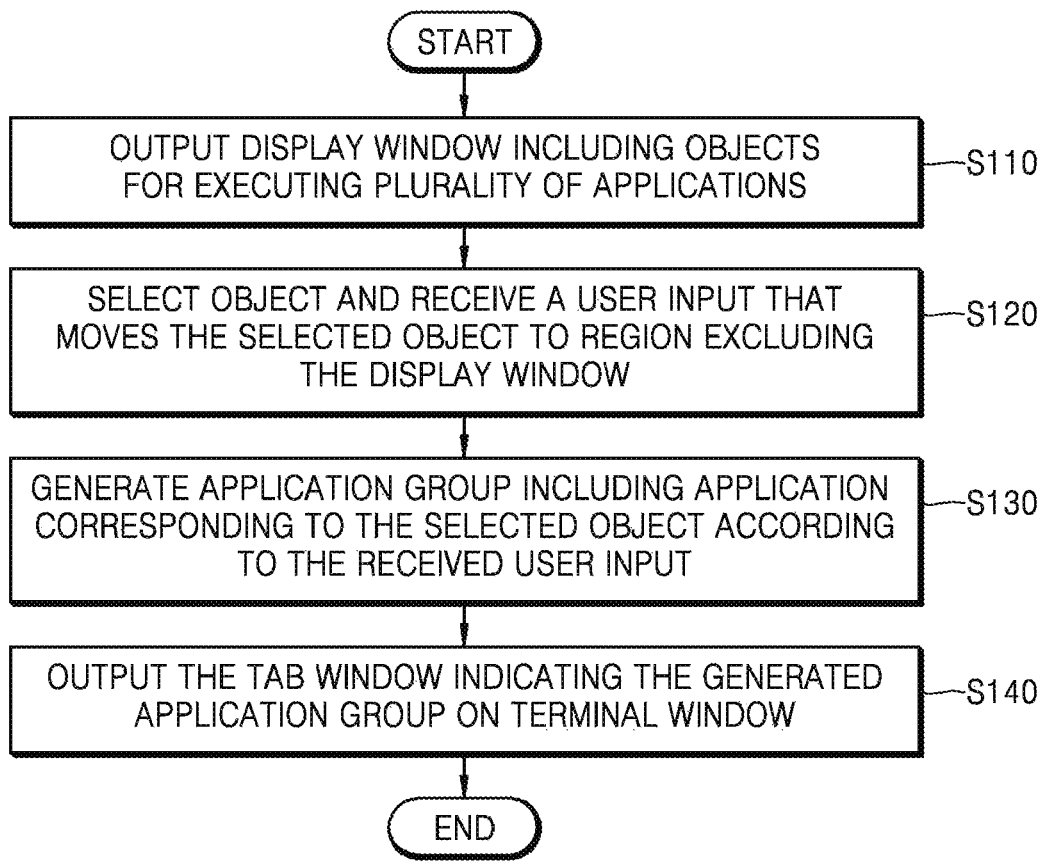
FIG. 1 is a flowchart of an example of a method of managing a tab window according to an embodiment of the present disclosure.

FIG. 1 is a flowchart of an example of a method of managing a tab window according to an embodiment of the present disclosure.

Figure 22:
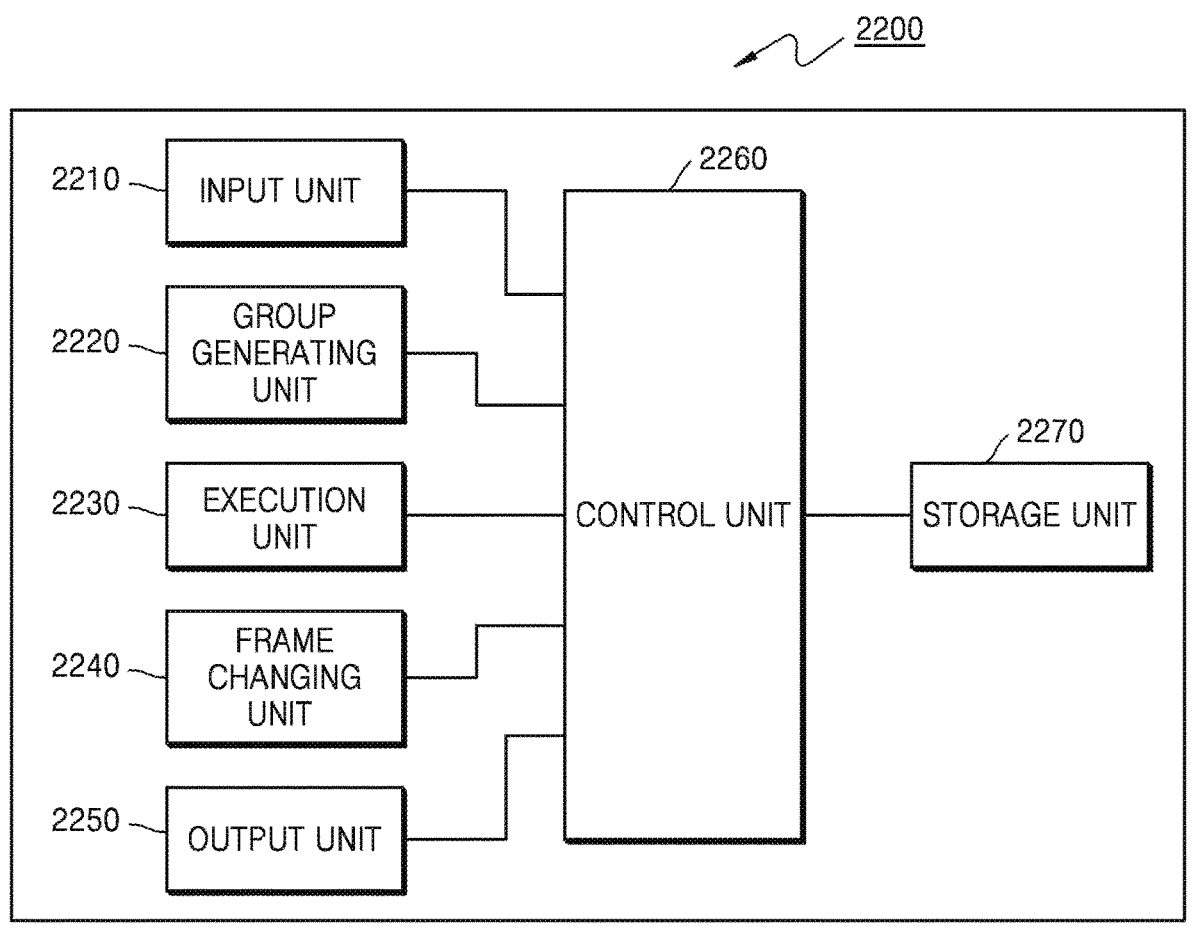
FIG. 22 is a block diagram of elements of a device according to an embodiment of the present disclosure.
Figure 23:
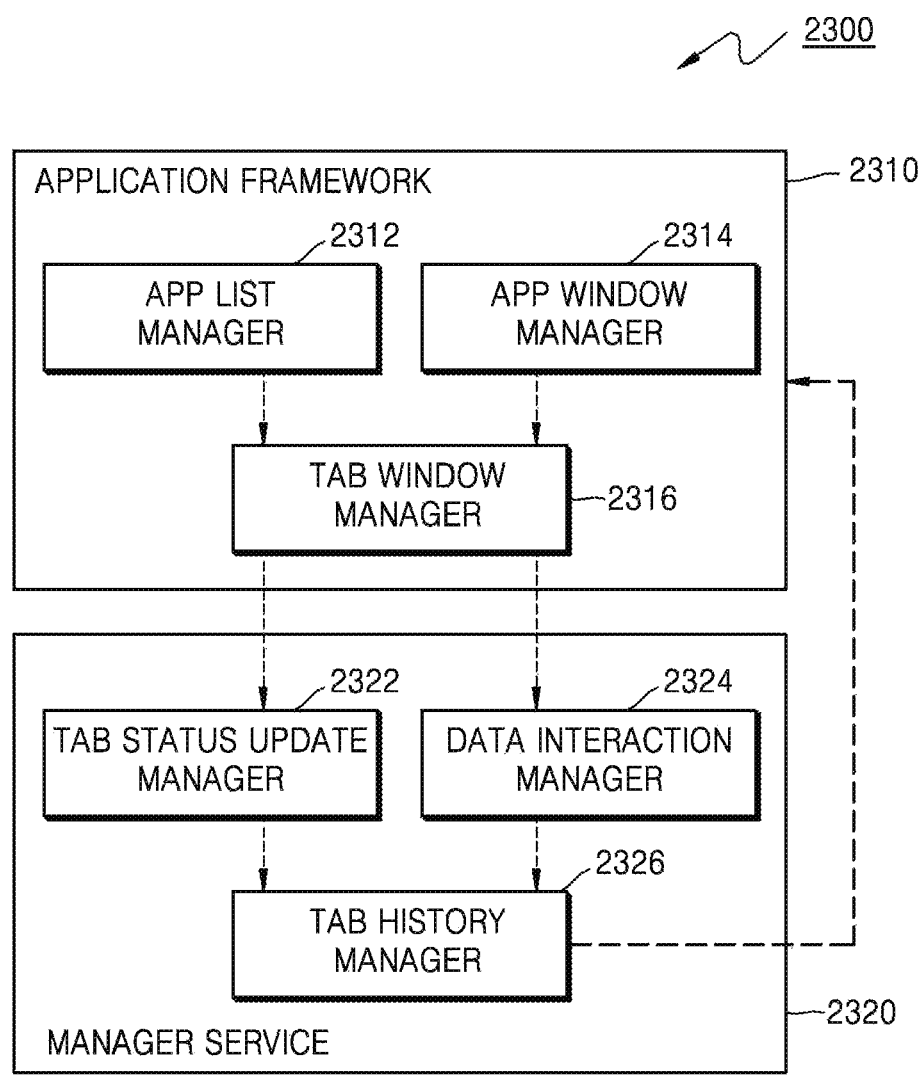
FIG. 23 is a block diagram of an example of a window grouping management architecture used by a device to manage a tab window according to an embodiment of the present disclosure.

Referring to FIG. 1, the method of managing the tab window includes operations that are time-serially performed by a device 2200 of FIG. 22 or 23. Thus, although omitted below, a description of the device 2200 of FIG. 22 or 23 that will be described later may apply to the method of managing the tab window of FIG. 1.

In operation S110, the device 2200 outputs a display window including at least one or more objects for executing a plurality of applications on a terminal screen.

An object refers to a graphic image (for example, an icon) that is set for each of the applications. For example, a user may select an icon displayed on the terminal screen, thereby executing an application corresponding to the icon. However, the object may correspond to a title of an application displayed on the terminal screen and the above-described graphic image as well. In other words, the object corresponds to any form displayed on the terminal screen to execute the application without limitation.

The display window may be one of an application tray including the applications installed in a terminal, and another tab window indicating a previously generated application group. In this regard, the application tray refers to a window on which objects corresponding to the applications installed in the terminal are aligned. The tab window refers to a window on which objects corresponding to applications included in the application group are aligned. In this regard, the application group refers to a set of applications included in one tab window.

In operation S120, the device 2200 selects the object and receives a user input that moves the selected object to a region excluding the display window. In this regard, the user input may be a user touch input through the terminal screen but is not limited thereto. In other words, the user input may be an input through a key pad (not shown) included in the terminal and a separate input device (not shown) connected to the terminal.

In operation S130, the device 2200 generates an application group including an application corresponding to the selected object according to the received user input. In this regard, the application group may include a plurality of heterogeneous applications. For example, the heterogeneous applications include applications having different execution objectives or applications having different processes for executing the applications.

In operation S140, the device 2200 outputs the tab window indicating the generated application group on the terminal window.

Hereinafter, the method of managing the tab window described with reference to FIG. 1 above (in more detail, a method of generating the tab window and displaying the tab window on the terminal screen) will now be described with reference to FIGS. 2 through 5.

FIGS. 2A to 2E illustrate examples in which the device 2200 generates tab windows 230, 240, 250, and 260 and displays the tab windows 230, 240, 250, and 260 on a terminal screen according to various embodiments of the present disclosure.

Figure 2A:
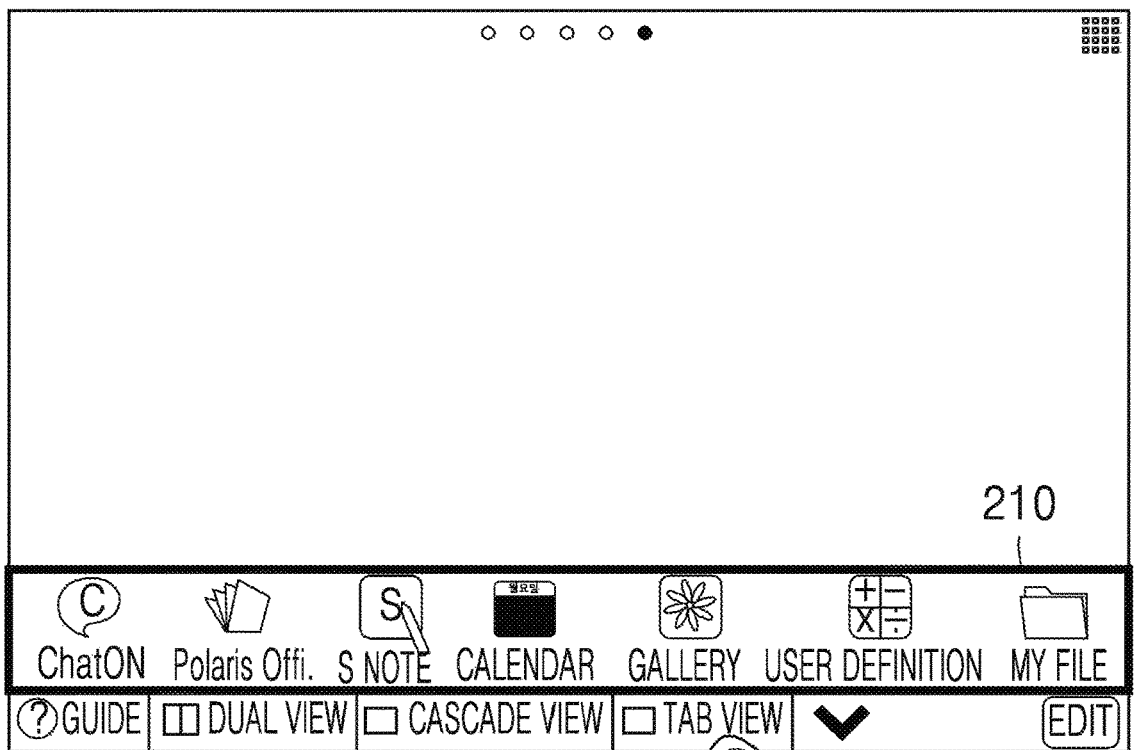
FIGS. 2A to 2E illustrate examples in which a device generates tab windows and displays the tab windows on a terminal screen according to various embodiments of the present disclosure.

Referring to FIG. 2A, the device 2200 outputs a display window 210 including at least one or more objects for executing a plurality of applications on the terminal screen. Referring to FIG. 2A, the display window 210 is shown as an application tray. The objects (for example, icons) respectively corresponding to the applications installed in a terminal are aligned in the display window 210.

A user selects one of the objects included in the display window 210. For example, the user may touch one of the objects included in the display window 210 or may move an object selected by drag and drop to a region of the terminal screen excluding the display window 210.

Figure 2B:
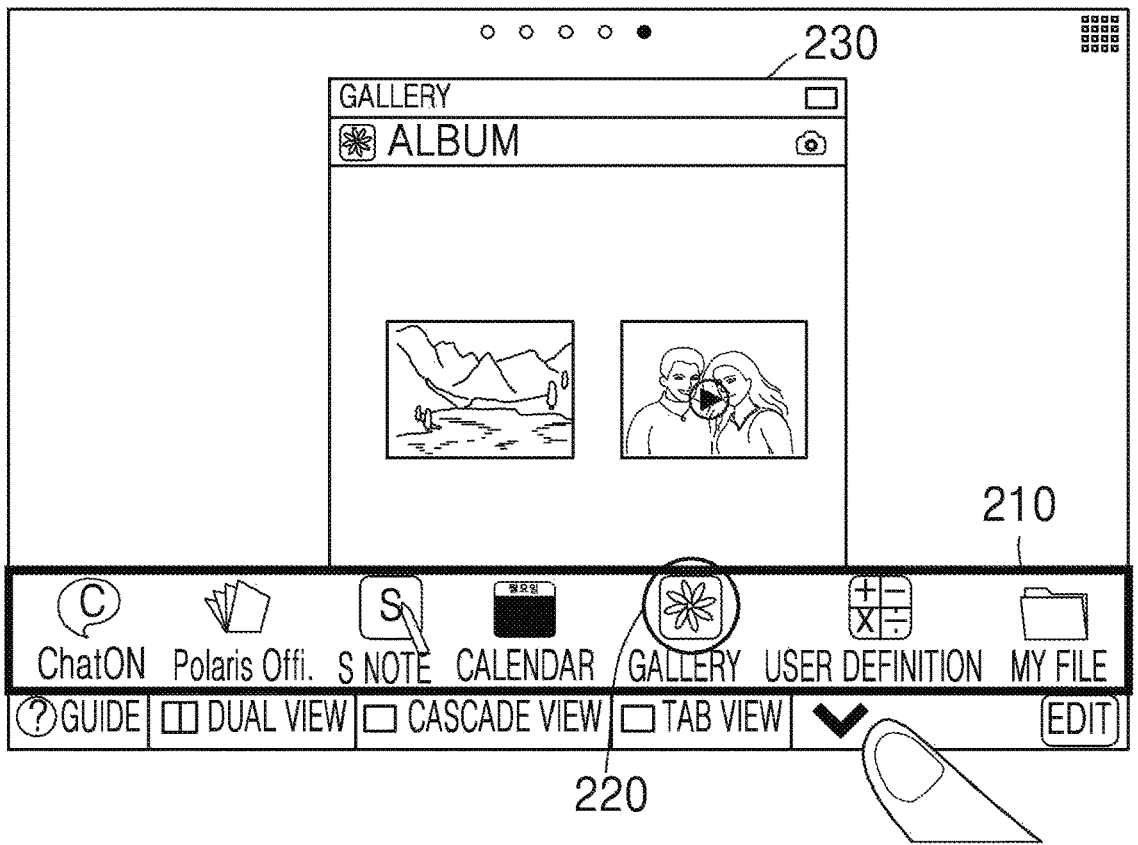

Referring to FIG. 2B, the user selects an object 220 by touching the object 220 from among the objects included in the display window 210. The device 2200 receives a user input that selects the object 220. The device 2200 generates an application group including the application corresponding to the object 220 selected according to the received user input. The device 2200 outputs the tab window 230 indicating the generated application group on the terminal screen.

Figure 2C:
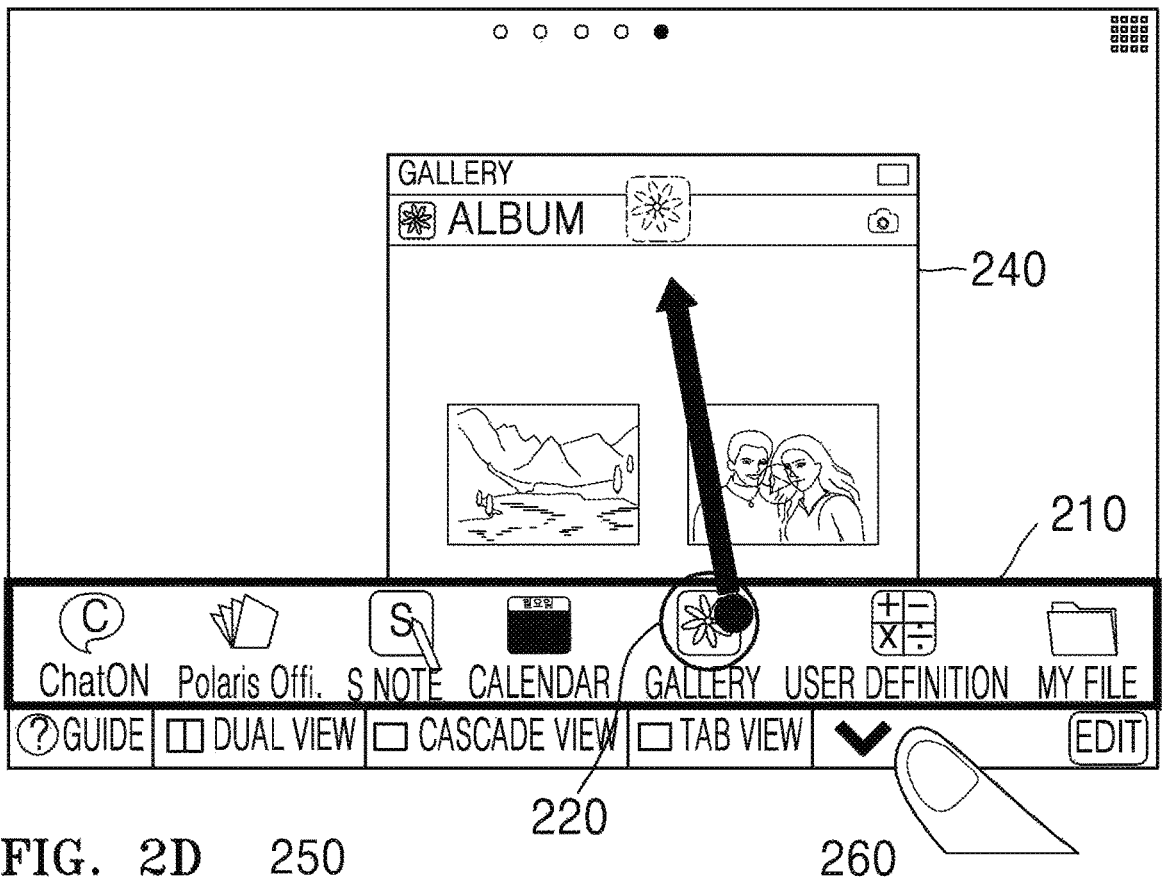

Referring to FIG. 2C, the user drags and drops the object 220 from among the objects included in the display window 210, and moves the selected object 220 to a region excluding the display window 210.

A process in which the device 2200 receives the user input, generates the application group, and outputs the tab window 240 on the terminal screen is the same as described with reference to FIG. 2B. In this regard, the tab window is displayed as a size corresponding to a previously determined region 240.

Referring to FIG. 2C, although the selected object 220 and the tab window 240 are simultaneously displayed on one screen, this is merely an example for description. In other words, an image of the selected object 220 disappears from a location from which the selected object 220 is moved, and the tab window 240 including the selected object 220 is only output on the terminal screen.

Figure 2D:
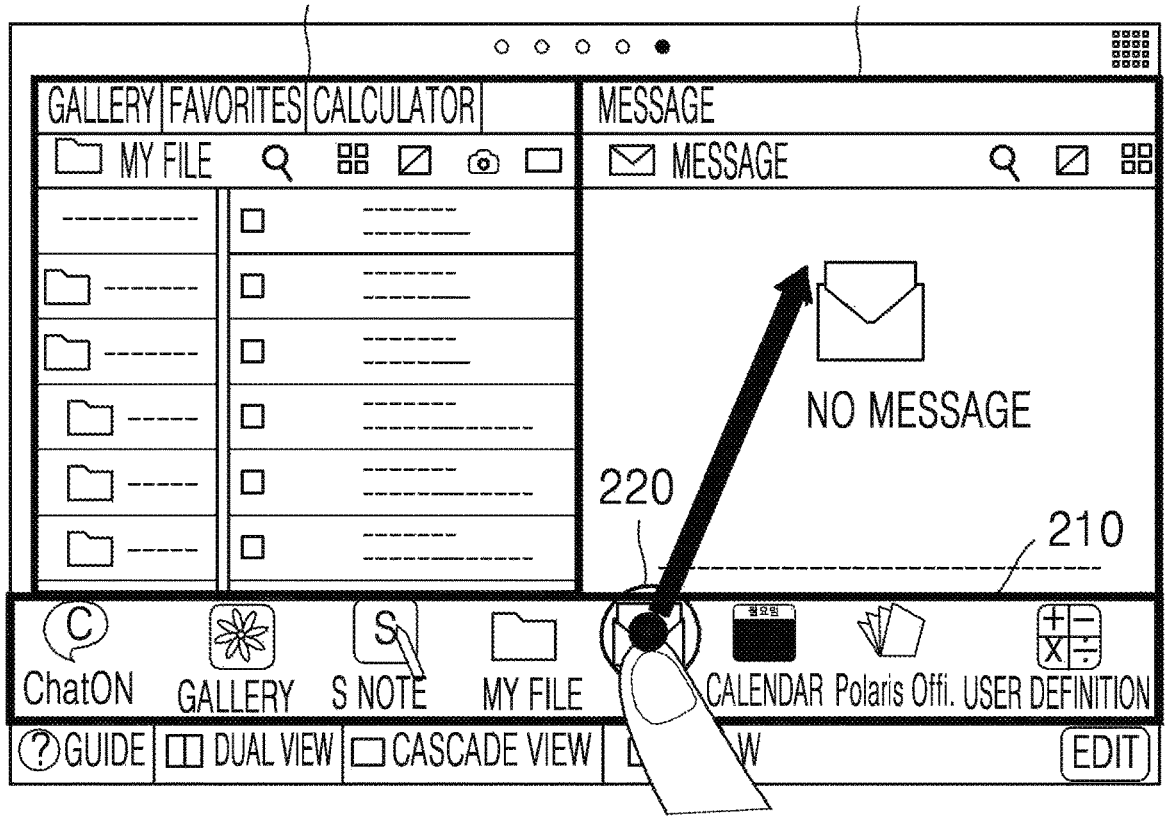

Referring to FIG. 2D, the tab window 250 indicating a previously generated application group is displayed on the terminal screen. In this regard, the operation described with reference to FIG. 2C above may apply.

In more detail, the user drags and drops the object 220 of the objects included in the display window 210 to a region excluding the display window 210. Thereafter, the device 2200 generates an application group including the application corresponding to the selected object 220, and outputs the tab window 260 indicating the generated application group on the terminal screen.

Figure 2E:
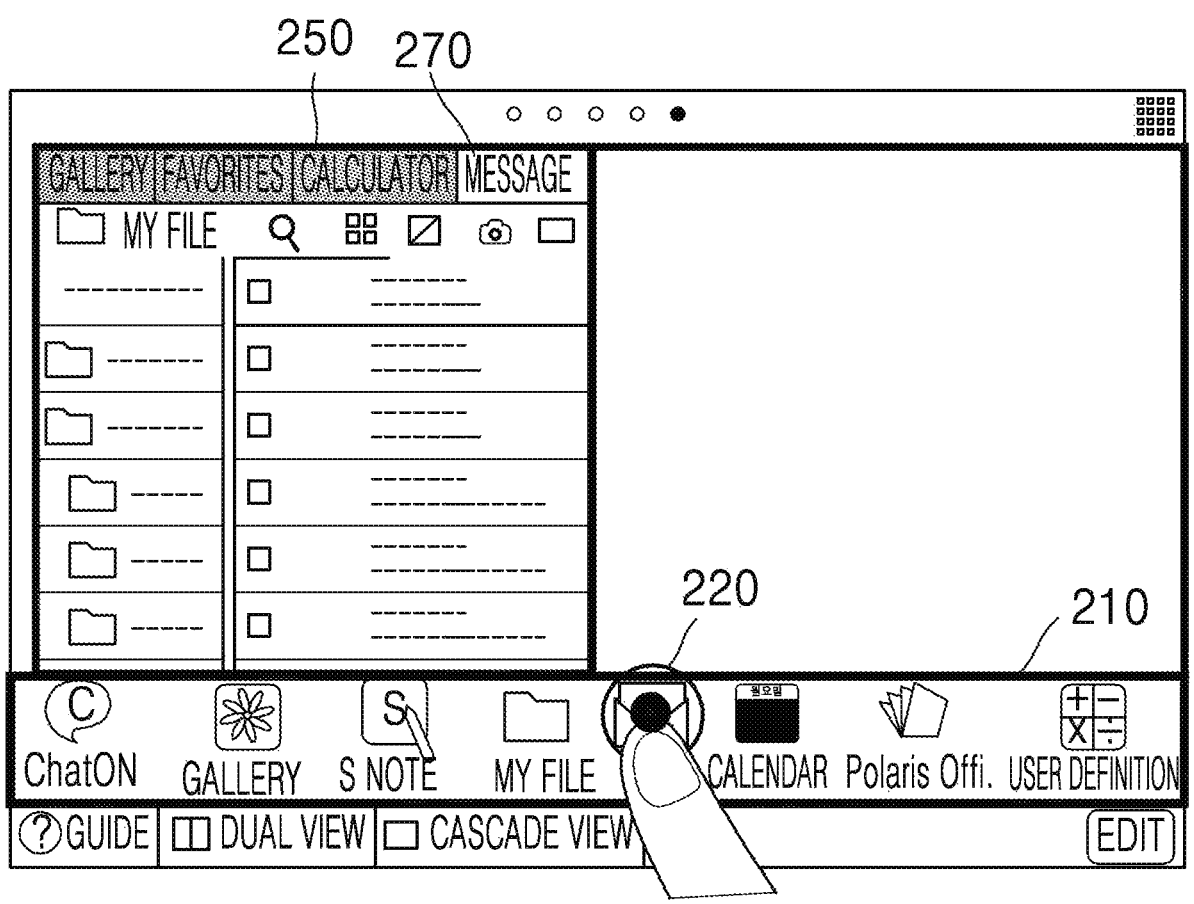

Referring to FIG. 2E, the tab window 250 indicating a previously generated application group is displayed on the terminal screen. In this regard, the user may touch the object 220 of the objects included in the display window 210.

The device 2200 includes the application corresponding to the selected object 220 in the application group indicating the tab window 250. The device 2200 may add and display 270 the object 220 selected by a user touch to a title bar of the tab window 250.

Meanwhile, the device 2200 stores information regarding the tab windows 230, 250, and 260. In this regard, the tab windows 230, 250, and 260 includes a list of the applications included in the application group or regions of the tab windows 230, 250, and 260. In more detail, the device 2200 stores information regarding applications included in the generated application group or locations and sizes of the tab windows 230, 250, and 260 displayed on the terminal screen.

Thereafter, when an input that displays the tab windows 230, 250, and 260 is received from the user, the device 2200 displays the tab windows 230, 250, and 260 on the terminal screen by using the stored information regarding the tab windows 230, 250, and 260.

FIGS. 3A and 3B illustrate other examples in which the device 2200 generates tab windows 310 and 340 and displays the tab windows on a terminal screen according to various embodiments of the present disclosure.

Referring to FIGS. 3A and 3B, the device 2200 outputs the display window 310 including at least one or more objects for executing a plurality of applications on the terminal screen. The display window 310 is illustrated as the tab window 310 in FIGS. 3A and 3B. The objects (for example, titles of the applications) respectively corresponding to the applications installed in a terminal are aligned in the display window 310.

In other words, the display window 310 may refer to another tab window indicating a previously generated application group. In this regard, the device 2200 may display the tab window on the terminal screen by using previously stored information regarding the tab window as described above.

Referring to FIG. 3A, a user selects an object 320 of the objects displayed on the display window 310. The user moves the selected object 320 to a region 330 excluding the display window 310. For example, the user may move the object 320 to the region 330 excluding the display window 310 by dragging and dropping the object 320. In this regard, the object 320 may be a predetermined region that displays the titles of the applications as shown in FIG. 3A.

The device 2200 generates an application group including an application corresponding to the selected object 320 according to a received user input. In other words, the device 2200 may generate an application group, other than the previously generated application group, by using the application corresponding to the selected object 320.

FIG. 3B illustrates an example of displaying the different tab windows 310 and 340 on the terminal screen. In other words, the device 2200 may simultaneously display the tab window 310 indicating the previously generated application group and the tab window 340 indicating the application group generated according to the user input.

Meanwhile, the selected object 320 described with reference to FIG. 3A above may be a plurality of objects 320. In other words, the user may select two or more objects from the objects displayed on the display window 310 by multi-touch. In this case, the tab window 340 described with reference to FIG. 3B above includes applications corresponding to the selected two or more objects.

As described above, the device 2200 may simultaneously display two or more tab windows on a terminal screen, and thus the user may more efficiently perform multi-tasking.

Figure 4:
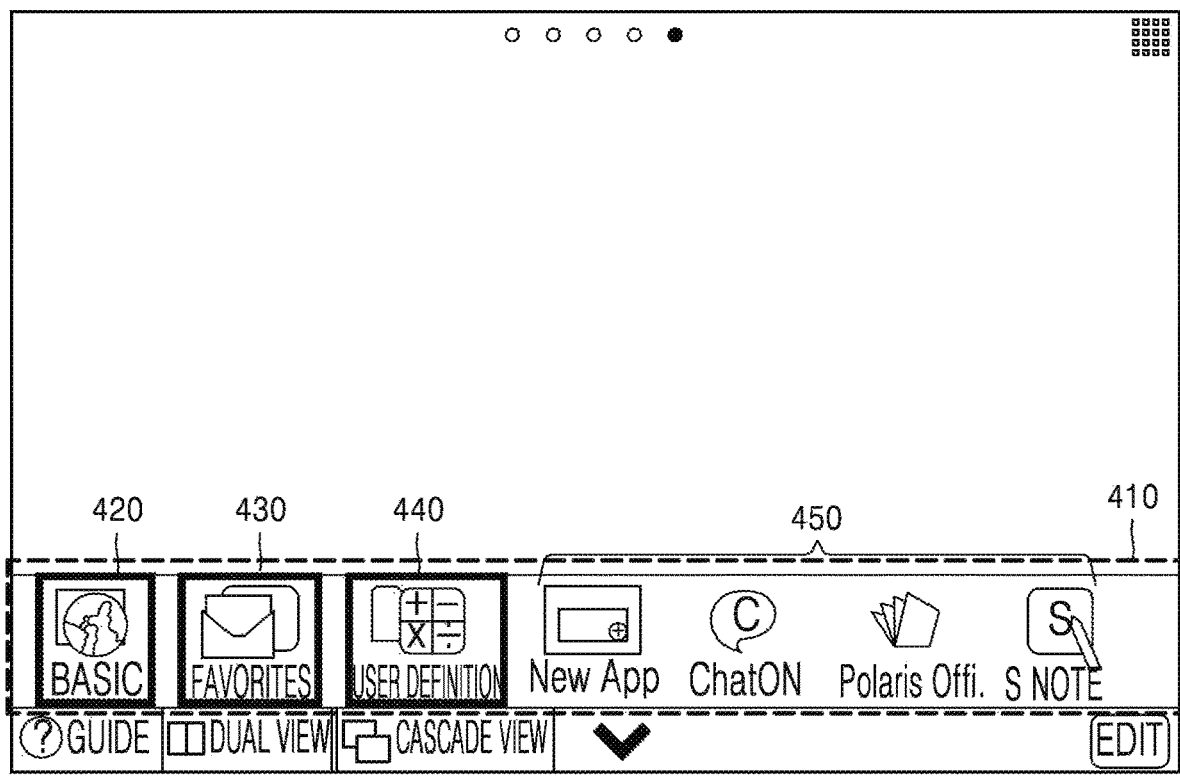
FIG. 4 illustrates an example in which a device displays objects indicating a tab window on a terminal screen according to an embodiment of the present disclosure.

FIG. 4 illustrates an example in which the device 2200 displays objects 420, 430, and 440 indicating a tab window on a terminal screen according to an embodiment of the present disclosure.

Referring to FIG. 4, the device 2200 may display the objects 420, 430, and 440 respectively indicating the tab window on a predetermined region of the terminal screen. For example, the device 2200 may display the objects 420, 430, and 440 respectively indicating the tab windows and objects 450 indicating applications on an application tray 410. If the device 2200 generates a plurality of tab windows, the device 2200 may display the objects 420, 430, and 440 respectively indicating the tab windows on the terminal screen.

Figure 5:
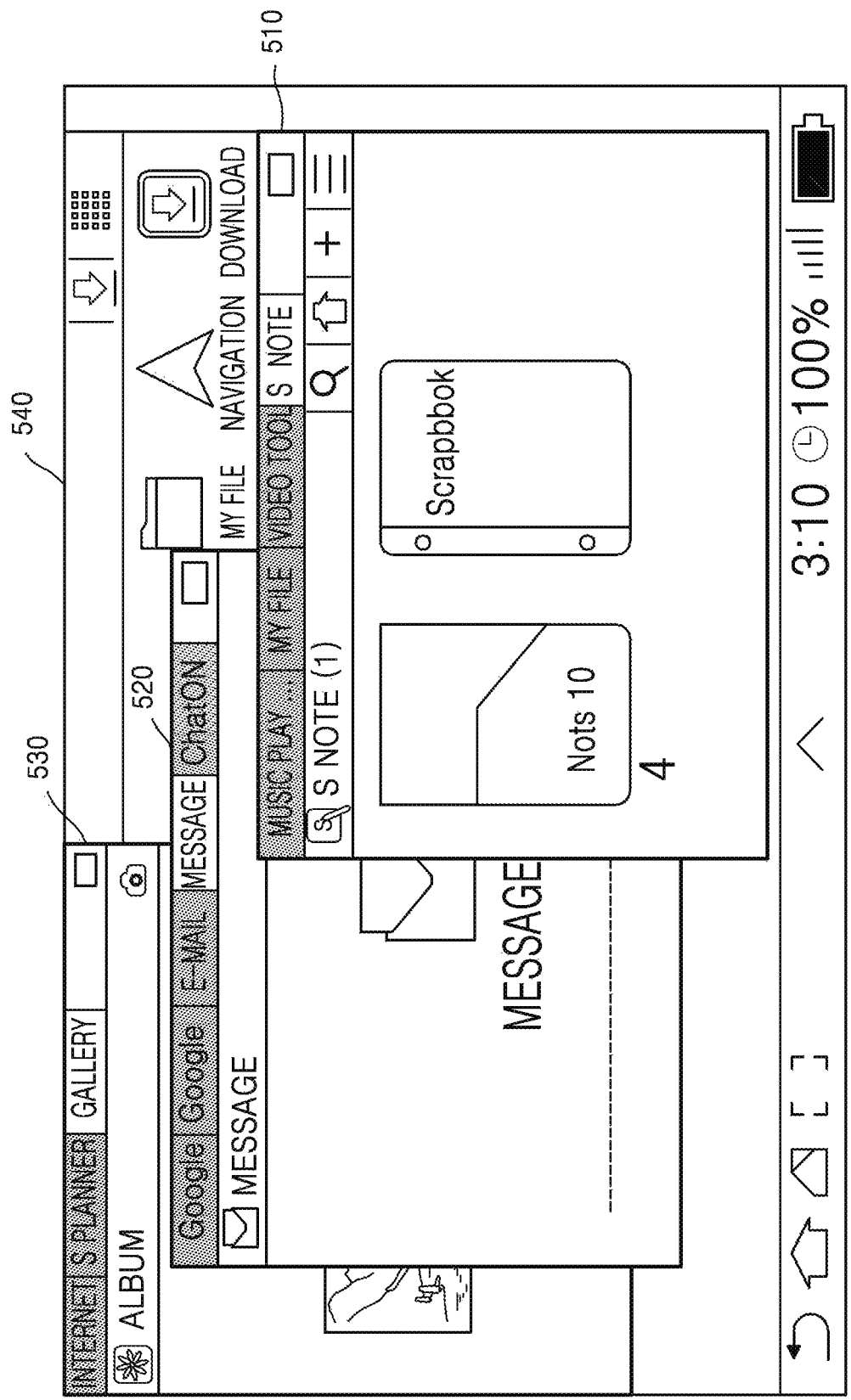
FIG. 5 illustrates an example in which a device displays tab windows on a terminal screen according to an embodiment of the present disclosure.

FIG. 5 illustrates an example in which the device 2200 displays tab windows 510, 520, 530, and 540 on a terminal screen according to an embodiment of the present disclosure.

Referring to FIG. 5, the device 2200 may display the tab windows 510, 520, 530, and 540 on the terminal screen. For example, the device 2200 may receive an input in which a user sequentially touches objects indicating a previously generated tab window and sequentially display tab windows corresponding to the touched objects on the terminal screen.

In this regard, the device 2200 may display the tab windows 510, 520, 530, and 540 on the terminal screen by using previously stored information regarding each of the tab windows 510, 520, 530, and 540. In other words, the device 2200 displays a tab window on the terminal screen by using a stored location and region of the tab window and a stored execution screen of an application. In this regard, the stored location and region of the tab window may refer to a location and region of the tab window at the time when the tab window ends, and the stored execution screen of the application may refer to an execution screen displayed at the time when the tab window ends.

FIG. 6 is a flowchart of another example of a method of managing a tab window according to an embodiment of the present disclosure.

Referring to FIG. 6, the method of managing the tab window includes operations that are time-serially performed by the device 2200 of FIG. 22 or 23. Thus, although omitted below, a description of the device 2200 of FIG. 22 or 23 that will be described later may apply to the method of managing the tab window of FIG. 6.

The flowchart of FIG. 6 includes the continuously performed operations of FIG. 1.

In operation S1510, the device 2200 receives a user input that selects an object for executing an application included in a tab window. In this regard, the object is the same as described with reference to FIG. 3A above. The user input may be a user touch input through a terminal screen but is not limited thereto as described above.

In operation S1610, the device 2200 executes the application according to the user input.

In operation S1710, the device 2200 outputs an execution screen of the executed application on the terminal screen. In this regard, the execution screen is output on at least partial region of the tab window.

Hereinafter, the method of managing the tab window described with reference to FIG. 6 above (in more detail, a method of displaying the execution screen of the application included in the tab window on the terminal screen) will now be described with reference to FIGS. 7A and 7B.

Figure 7A:
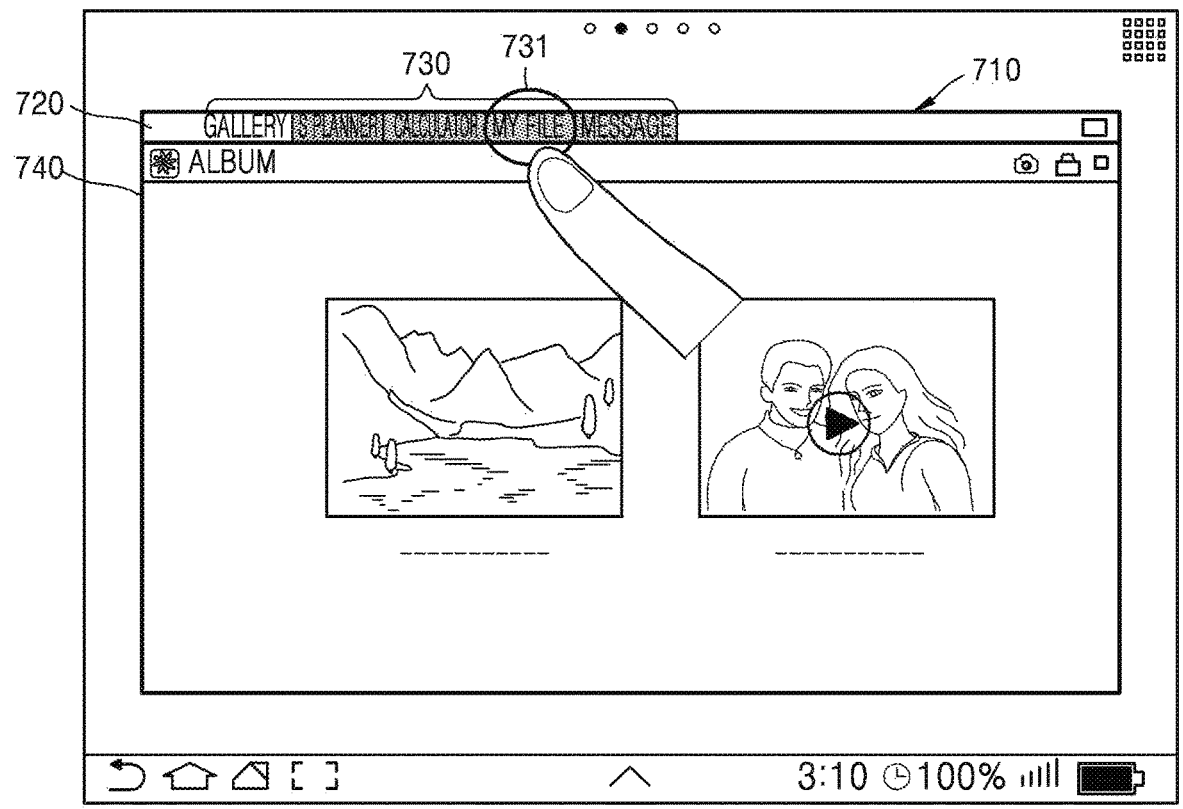
FIGS. 7A and 7B illustrate examples in which a device displays an execution screen of one of applications included in a tab window on a terminal screen according to various embodiments of the present disclosure.
Figure 7B:
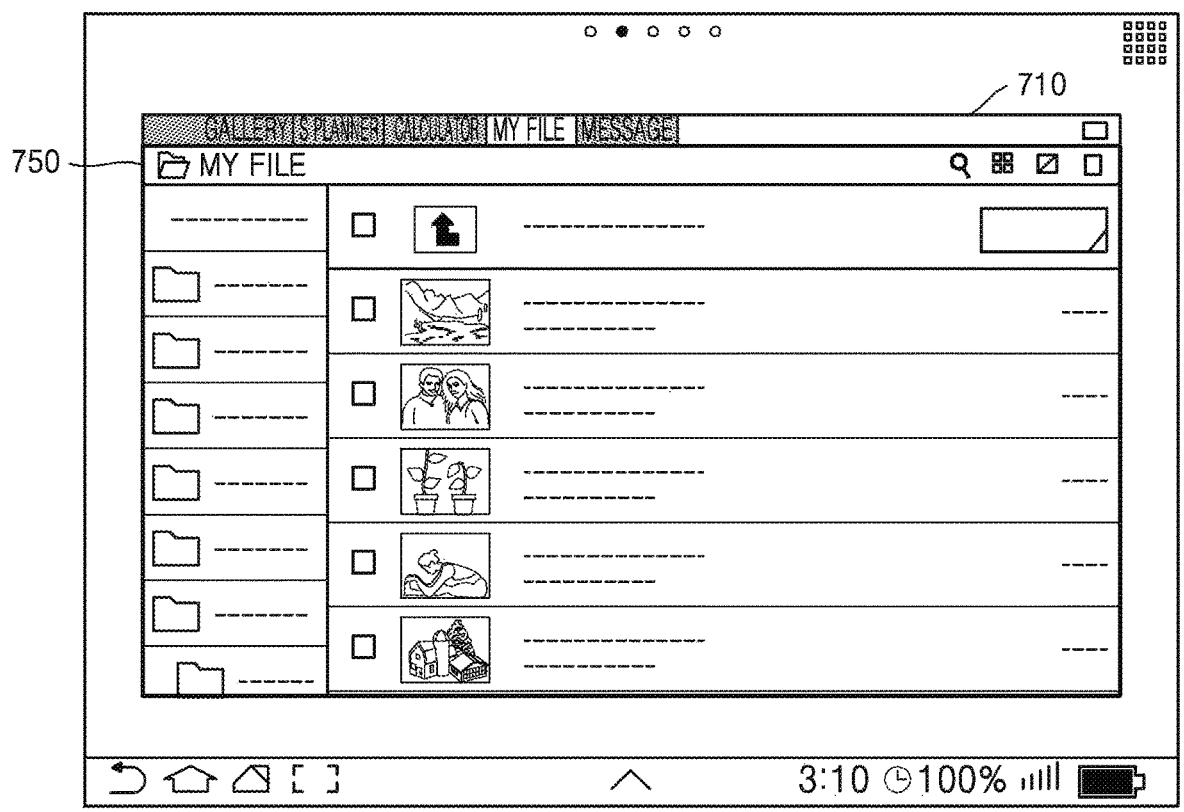

FIGS. 7A and 7B illustrate examples in which the device 2200 displays an execution screen of one of applications included in a tab window 710 on a terminal screen according to various embodiments of the present disclosure.

Referring to FIG. 7A, the tab window 710 is displayed on a partial region of the terminal screen. A partial region 720 of the tab window 710 displays objects 730 for executing the applications included in the tab window 710. Another partial region 740 of the tab window 710 displays the execution screen of one of the applications included in the tab window 710.

A user selects an object 731 from the objects 730 for executing the applications included in the tab window 710. For example, the user may select the object 731 by multi-touch.

The device 2200 executes an application corresponding to the object 731 selected by the user. The device 2200 outputs the execution screen of the application on the terminal screen.

Referring to FIG. 7B, the execution screen of the application executed by the device 2200 is displayed on a partial region 750 of the tab window 710. In other words, if the user selects the object 731, and a new application is executed, the device 2200 converts the previously displayed execution screen of the application into an execution screen of the new application executed according to a user input.

As described with reference to FIGS. 7A and 7B above, when one of the applications included in the tab window 710 is executed, the execution screen of the application is displayed without exceeding a region indicating the tab window 710. Thus, if a plurality of tab windows is displayed on the terminal window, and regions indicating the displayed tab windows do not overlap, the user may see execution screens of applications executed in the tab applications without overlapping the execution screens. Thus, the user may more efficiently perform multi-tasking.

Figure 8:
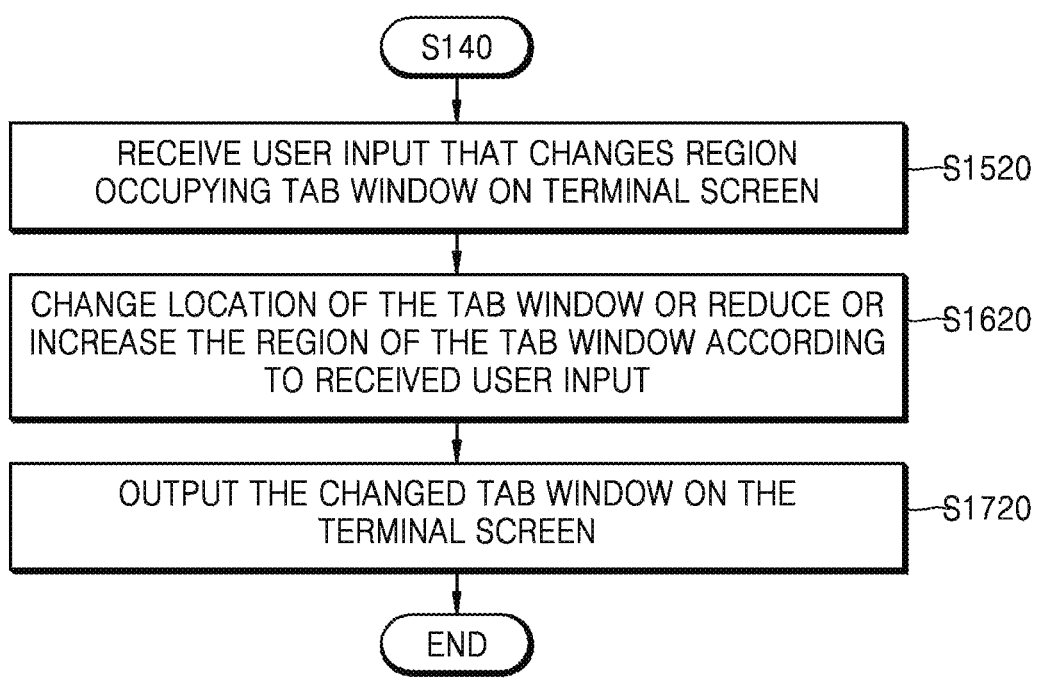
FIG. 8 is a flowchart of another example of a method of managing a tab window according to an embodiment of the present disclosure.

FIG. 8 is a flowchart of another example of a method of managing a tab window according to an embodiment of the present disclosure.

Referring to FIG. 8, the method of managing the tab window includes operations that are time-serially performed by the device 2200 of FIG. 22 or 23. Thus, although omitted below, a description of the device 2200 of FIG. 22 or 23 that will be described later may apply to the method of managing the tab window of FIG. 8.

The flowchart of FIG. 8 includes the continuously performed operations of FIG. 1.

In operation S1520, the device 2200 receives a user input that changes a region occupying the tab window on a terminal screen.

In operation S1620, the device 2200 changes a location of the tab window or reduces or increases the region of the tab window according to the received user input.

In operation S1720, the device 2200 outputs the tab window on the terminal screen. In this regard, the output tab window refers to a result obtained by reflecting a location change of the tab window or a region change thereof that is performed in operation S1620.

Hereinafter, the method of managing the tab window described with reference to FIG. 8 above (in more detail, a method of displaying the changed tab window on the terminal screen) will now be described with reference to FIGS. 9A to 9C.

Figure 9B:
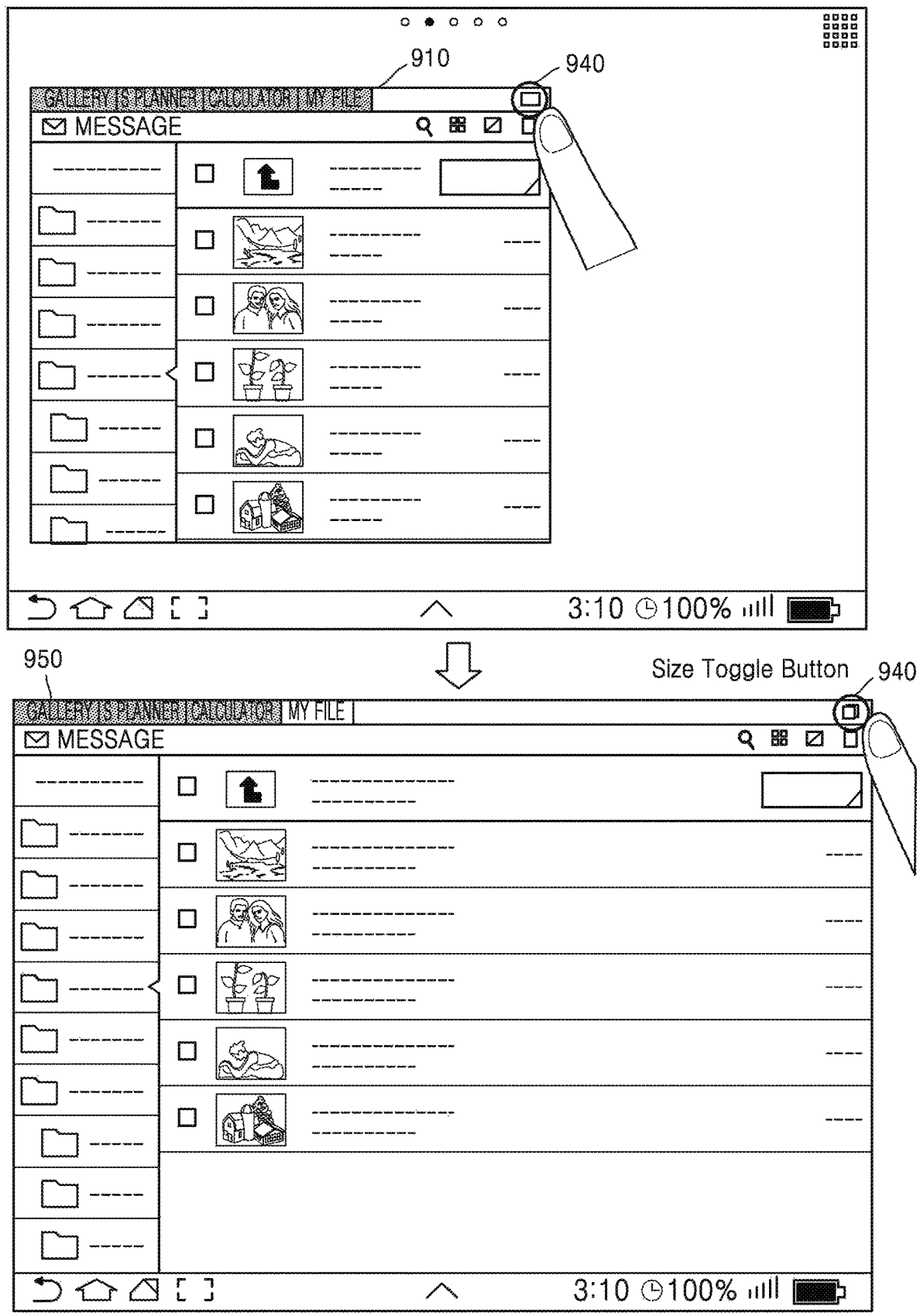
Figure 9C:
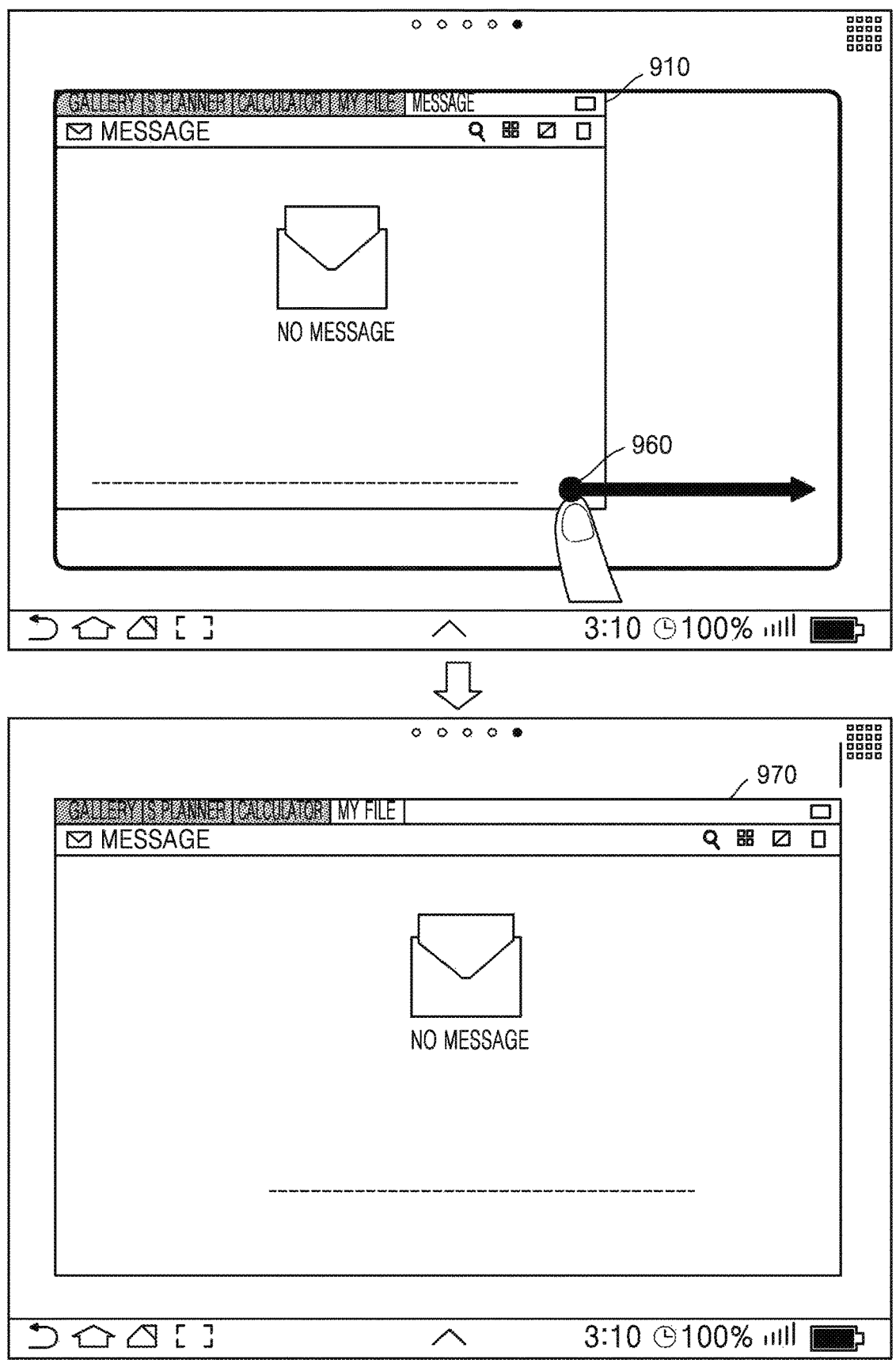

FIGS. 9A to 9C illustrate examples in which the device 2200 displays changed tab windows 930, 950, and 970 on a terminal screen according to various embodiments of the present disclosure.

Referring to FIGS. 9A to 9C, the device 2200 changes locations or regions of tab windows. In more detail, FIG. 9A illustrates an example in which the device 2200 changes a location of the tab window 930, and FIGS. 9B and 9C illustrate examples in which the device 2200 changes regions of the tab windows 950 and 970.

Referring to a top figure of FIG. 9A, a user may drag a predetermined region 920 of a tab window 910 displayed on the terminal screen in a moving direction while touching the predetermined region 920. In this regard, the predetermined region 920 may be a region that displays titles of applications included in a tab window but is not limited thereto.

Referring to a bottom figure of FIG. 9A, the device 2200 changes the location of the tab window 930 corresponding to a dragging direction and displays the changed location of the tab window 930 on the terminal screen.

Referring to a top figure of FIG. 9B, the user may touch an object 940 displayed on a part of the tab window 910 that is displayed on the terminal screen. In this regard, the object 940 refers to a graphic image that may reduce or increase the region of the tab window 910.

Referring to a bottom figure of FIG. 9B, the device 2200 may increase or reduce a region indicating the tab window 950 according to a user touch. In more detail, when the tab window 950 is displayed on only a part of the terminal screen, the device 2200 increases and displays the tab window 950 to a whole of the terminal screen. When the tab window 950 is displayed on the whole of the terminal screen, the device 2200 reduces and displays the tab window 950 to a part of the terminal screen.

Referring to a top figure of FIG. 9C, a user may drag the region of the tab window 910 in a changing direction while touching a predetermined location 960 of the tab window 910 displayed on the terminal screen. In this regard, the predetermined location 960 may be an edge of the tab window but is not limited thereto.

Referring to a bottom figure of FIG. 9C, the device 2200 changes a region of the tab window 970 corresponding to a dragging direction and displays the changed region of the tab window 970 on the terminal screen. In more detail, when the user drags the tab window 970 to the inside of a region currently occupying the tab window 910, the device 2200 reduces and displays the region of the tab window 970. When the user drags the tab window 970 to the outside of the region currently occupying the tab window 910, the device 2200 increases and displays the region of the tab window 970.

Meanwhile, the device 2200 stores information regarding a changed location or region of a tab window. In more detail, the device 2200 renews and stores previously stored information regarding a location or a region of the tab window to information regarding the changed location or region. Thus, if the location or the region of the tab window is changed, the tab window is terminated and then is executed again, and the device 2200 displays the tab window on the terminal screen by using the renewed information.

Figure 10:
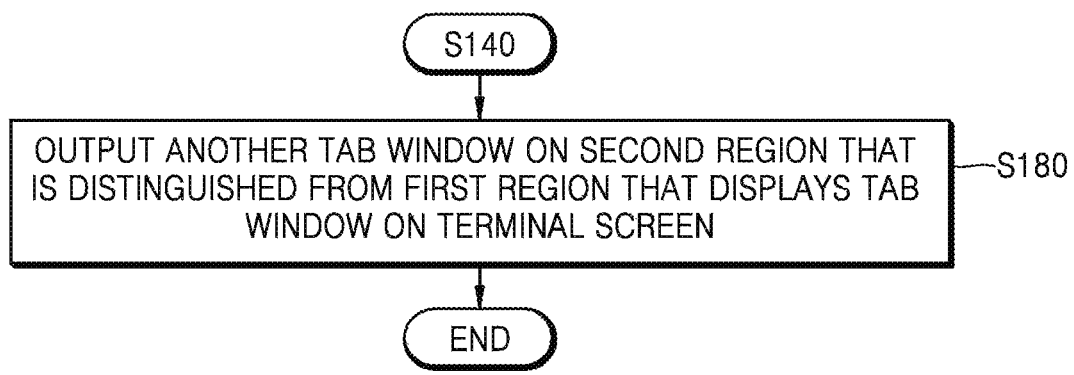
FIG. 10 is a flowchart of another example of a method of managing tab windows according to an embodiment of the present disclosure.

FIG. 10 is a flowchart of another example of a method of managing tab windows according to an embodiment of the present disclosure.

Referring to FIG. 10, the method of managing the tab windows includes operations that are time-serially performed by the device 2200 of FIG. 22 or 23. Thus, although omitted below, a description of the device 2200 of FIG. 22 or 23 that will be described later may apply to the method of managing the tab window of FIG. 10.

The flowchart of FIG. 10 includes the continuously performed operations of FIG. 1.

In operation S180, the device 2200 outputs another tab window on a second region that is distinguished from a first region that displays a tab window on a terminal screen. In this regard, the other tab window is not a tab window that is already output on the terminal screen but is a tab window indicating a previously generated application group.

Hereinafter, the method of managing the tab window described with reference to FIG. 10 above (in more detail, a method of displaying a plurality of tab windows on the terminal screen) will now be described with reference to FIGS. 11A to 11D.

FIGS. 11A to 11D illustrate examples in which the device 2200 converts and displays execution screens 1110, 1120, 1130, and 1150 of a plurality of applications to a tab window mode according to various embodiments of the present disclosure.

Figure 11A:
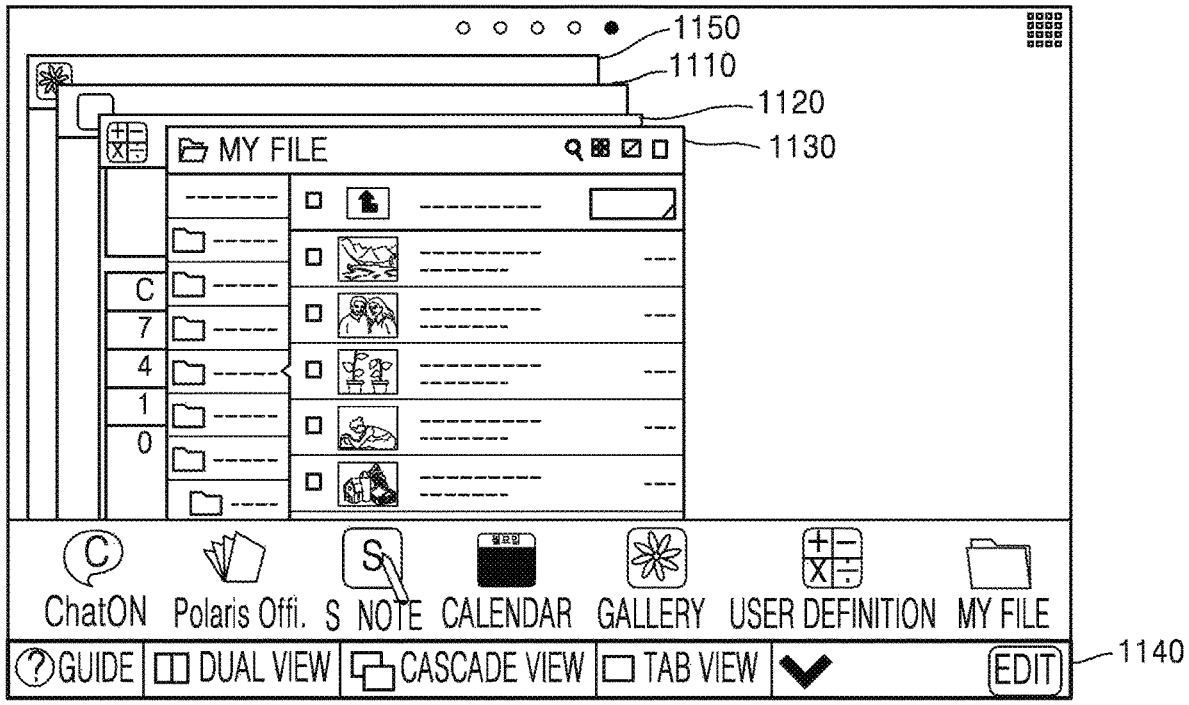
FIGS. 11A to 11D illustrate examples in which a device converts and displays execution screens of a plurality of applications to a tab window mode according to various embodiments of the present disclosure.

Referring to FIG. 11A, the execution screens 1110, 1120, 1130, and 1150 of the applications are displayed on a terminal screen. Hereinafter, examples of converting the execution screens 1110, 1120, 1130, and 1150 displayed on the terminal screen to the tab window mode will now be described with reference to FIGS. 11A to 11D. In this regard, the tab window mode may correspond to a cascade mode, a dual mode, etc. but is not limited thereto. In other words, the tab window mode may correspond to any types of modes that may display the execution screens 1110, 1120, 1130, and 1150 according to a predetermined rule without limitation.

Figure 11B:
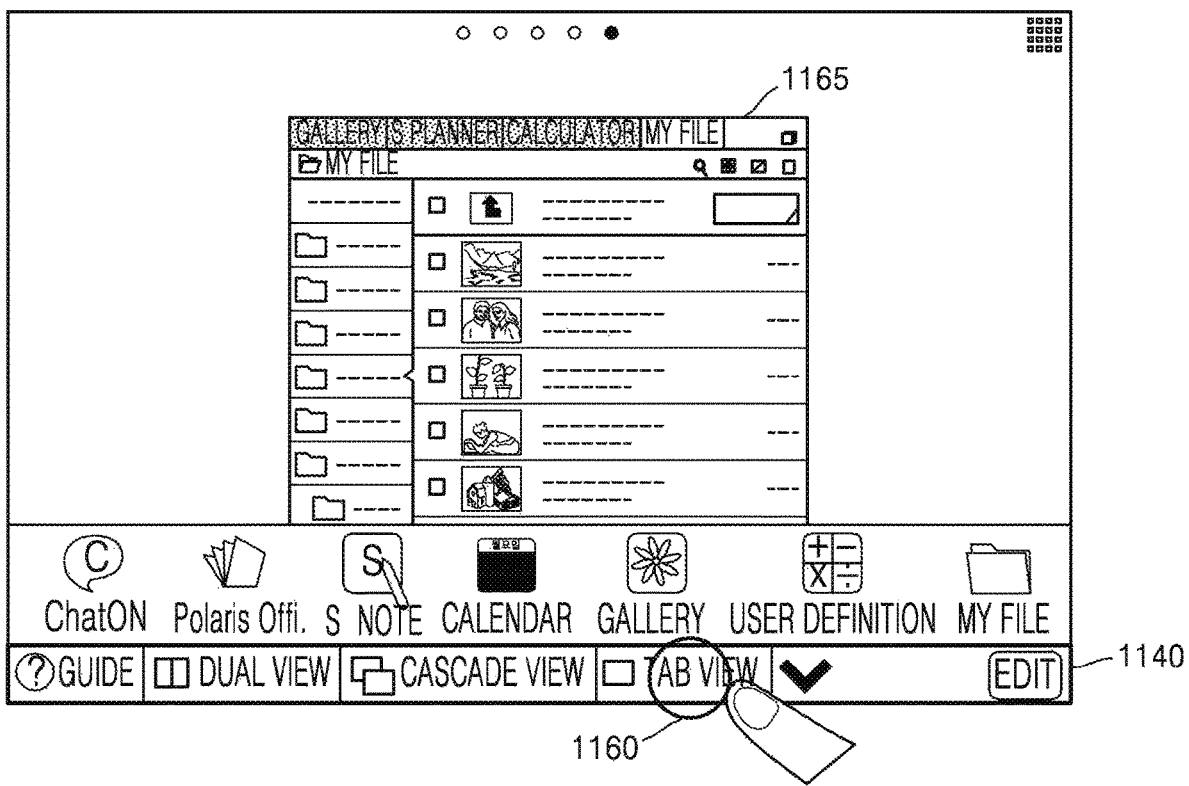

Referring to FIGS. 11A and 11B, when a user touches a "tab view" 1160 among objects displayed on a predetermined region 1140 of the terminal screen, the device 2200 may collect and display the execution screens 1110, 1120, 1130, and 1150 on a single tab window 1165. In this regard, when the user touches the "tab view" 1160, the device 2200 separates and displays the tab window 1165 into the execution screens 1110, 1120, 1130, and 1150. In other words, when the user touches the "tab view" 1160, the device 2200 turns on or off a tab mode.

Figure 11C:
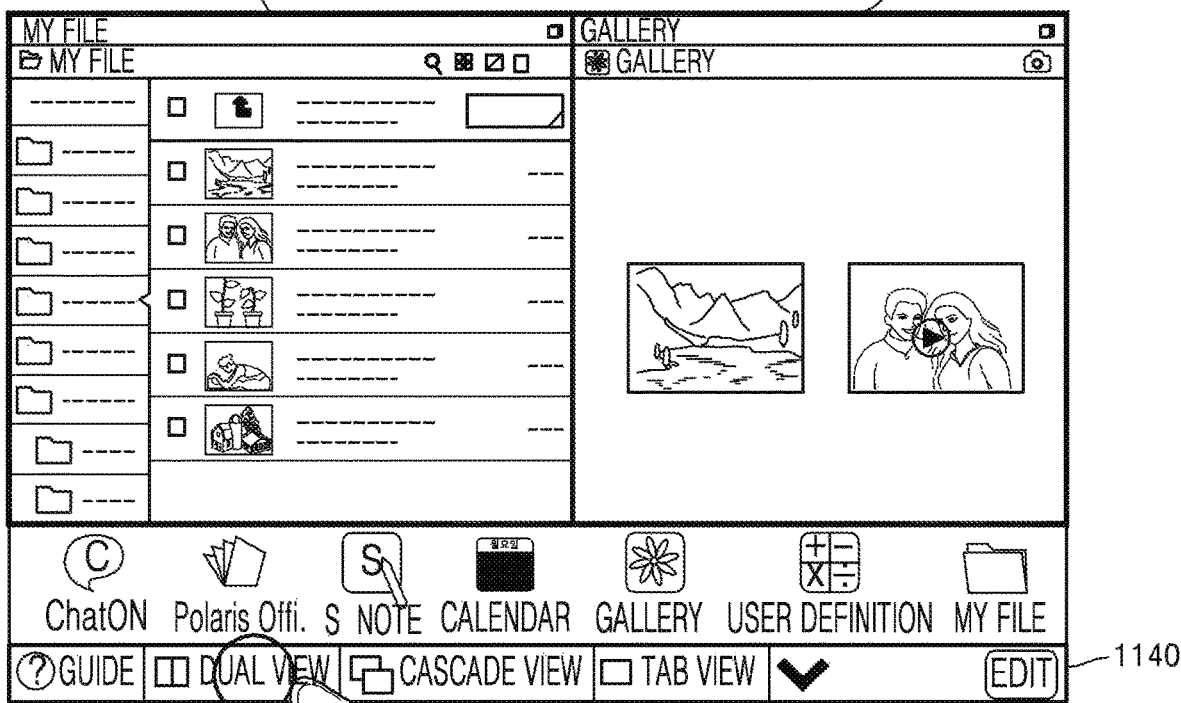

Referring to FIGS. 11B and 11C, when the user touches a "dual view" 1170 among the objects displayed on the predetermined region 1140 of the terminal screen, the device 2200 converts and displays the tab window 1165 to the dual mode. An example in which the device 2200 displays the tab window 1165 in the dual mode.

For example, the device 2200 may split the terminal screen into two regions 1171 and 1173 and display an execution screen of each of a plurality of applications included in the tab window 1165 on one of the regions 1171 and 1173. In other words, if four applications are included in the tab window 1165, the device 2200 may display two execution screens on the left region 1171 and two execution screens on the right region 1173.

As another example, the device 2200 may split the terminal screen into the two regions 1171 and 1173 and display the tab window 1165 on one of the regions 1171 and 1173. Thereafter, when the user executes a new application, the device 2200 may display an execution screen of the executed new application on the other one of the regions 1171 and 1173.

Figure 11D:
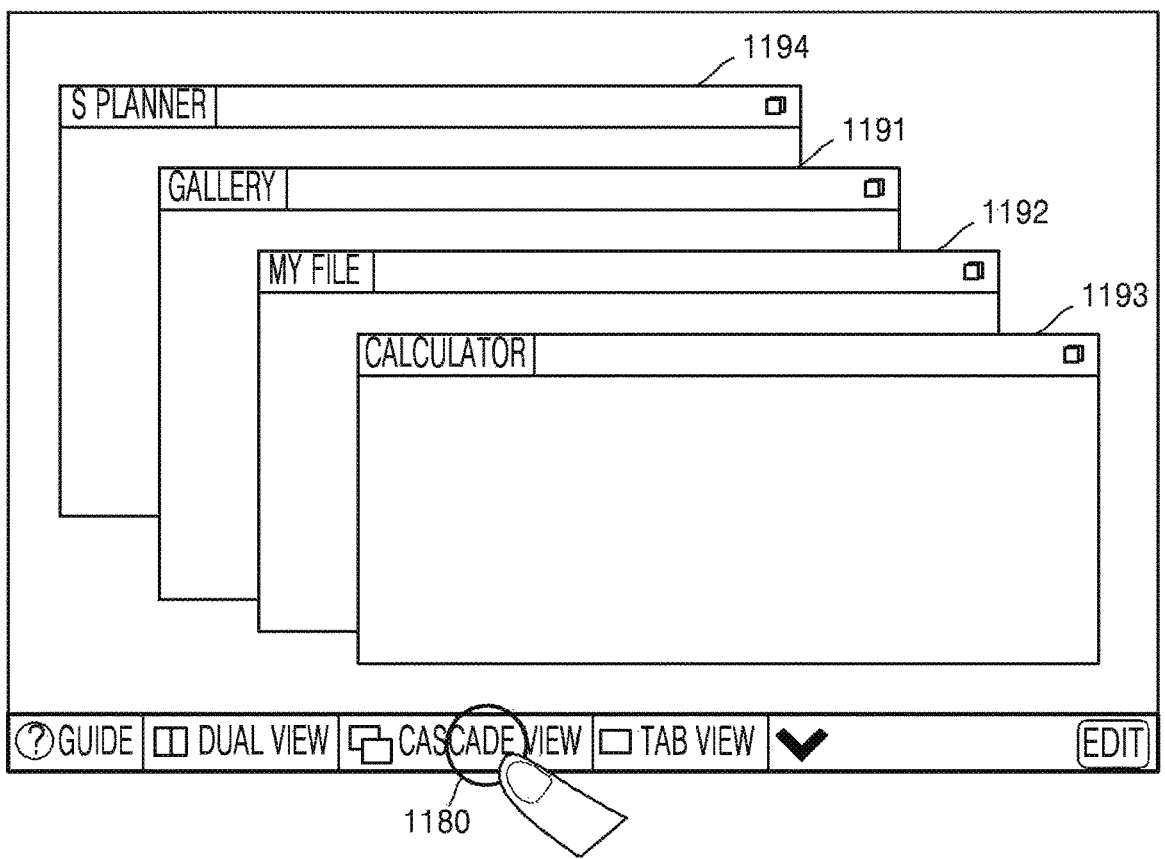

Referring to FIGS. 11C and 11D, when the user touches a "cascade view" 1180 among the objects displayed on the predetermined region 1140 of the terminal screen, the device 2200 converts and displays the tab window 1165 to the cascade mode.

For example, if four applications are included in the tab window 1165, the device 2200 may generate four tab windows 1191, 1192, 1193, and 1194 respectively including the four applications, and display the generated tab windows 1191, 1192, 1193, and 1194 on the terminal screen in a cascade form.

In this regard, when the user touches the "tab view" 1160 again, the device 2200 may separate and display the tab window 1165 into the execution screens 1110, 1120, 1130, and 1150 again.

As described above, the user may freely convert the execution screens 1110, 1120, 1130, and 1150 of the applications to the tab window mode. Thus, the user may more effectively perform multi-tasking.

Figure 12:
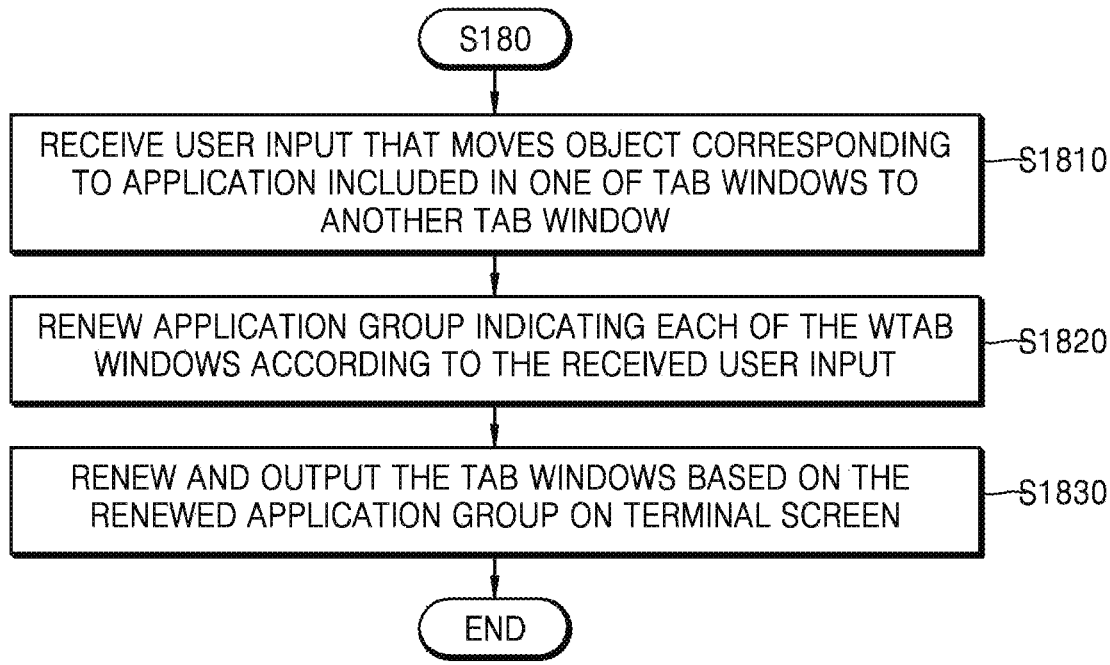
FIG. 12 is a flowchart of another example of a method of managing tab windows according to an embodiment of the present disclosure.

FIG. 12 is a flowchart of another example of a method of managing tab windows according to an embodiment of the present disclosure.

Referring to FIG. 12, the method of managing the tab windows includes operations that are time-serially performed by the device 2200 of FIG. 22 or 23. Thus, although omitted below, a description of the device 2200 of FIG. 22 or 23 that will be described later may apply to the method of managing the tab windows of FIG. 12.

The flowchart of FIG. 12 includes the continuously processed operations of FIG. 10. In other words, the method of managing the tab windows of FIG. 12 includes operations that are performed when the tab windows are displayed on a terminal screen.

In operation S1810, the device 2200 receives a user input that moves an object corresponding to an application included in one of the tab windows to another tab window. In this regard, the user input may correspond to dragging and dropping an object corresponding to an application included in the one tab window and moving the object to the other tab window. The user input will be described in detail with reference to FIGS. 15A and 15B later.

In operation S1820, the device 2200 renews an application group indicating each of the tab windows according to the received user input. In more detail, the device 2200 may renew the application group by excluding the application corresponding to the moved object from an application group included in one of the tab windows and adding the application to an application included in the other tab window.

In operation S1830, the device 2200 renews and outputs the tab windows based on the renewed application group on the terminal screen. In more detail, the device 2200 may correct and output an application list displayed on each of the tab windows by using information regarding the application group renewed in operation S1820 on the terminal screen.

The device 2200 stores information regarding the renewed tab windows. In this regard, the information regarding the tab windows may refer to a list of applications included in the renewed application group or regions of the two windows. In more detail, the device 2200 stores information regarding applications included in a generated application group or information regarding locations and sizes of tab windows displayed on the terminal screen.

The method described with reference to FIG. 12 above corresponds to a method of exchanging applications between a plurality of tab windows. In other words, the device 2200 may move an application included in one of the plurality of tab windows based on a user gestures to another tab window.

The device 2200 may independently generate a new tab window by using the application included in one of the tab windows. In more detail, the method in which the device 2200 generates the new tab window by using information regarding moving of an object corresponding to the application included in one of the tab windows is the same as described with reference to FIGS. 3A and 3B.

According to various embodiments, the applications may be exchanged between the plurality of tab windows and data included in the applications may also be exchanged as well. A method of exchanging the data included in the applications between the plurality of tab windows will be described in detail with reference to FIG. 13 later.

Figure 13:
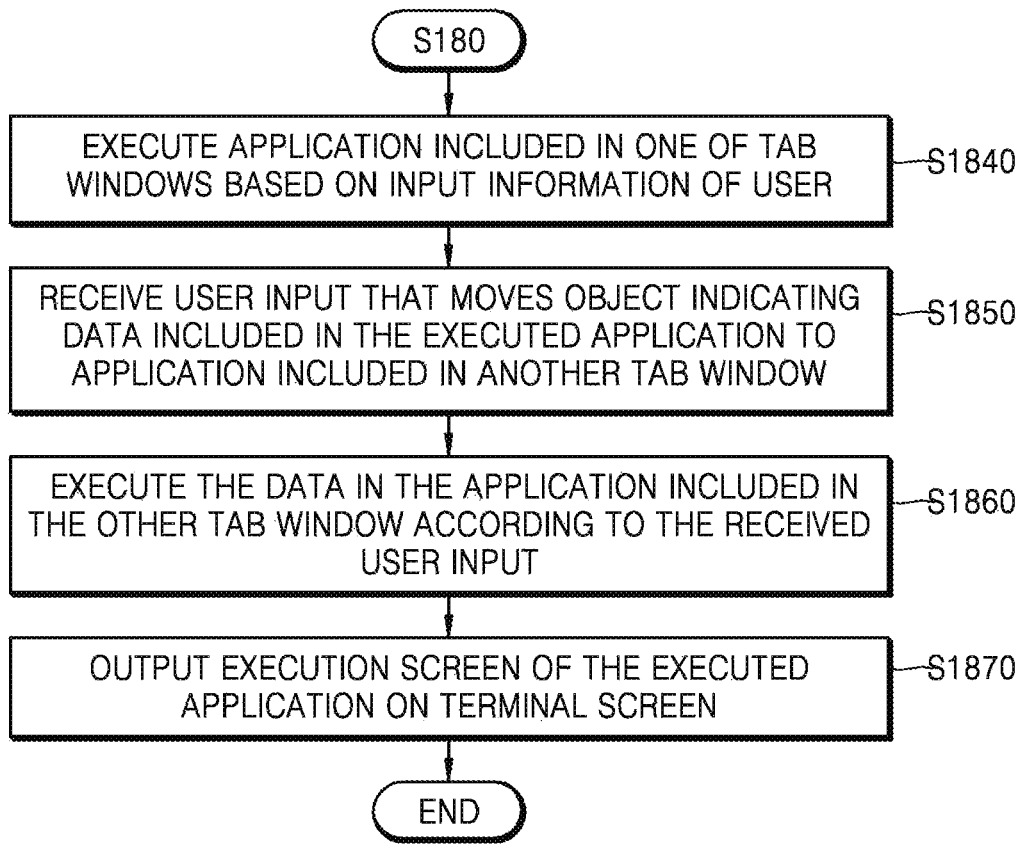
FIG. 13 is a flowchart of another example of a method of managing tab windows according to an embodiment of the present disclosure.

FIG. 13 is a flowchart of another example of a method of managing tab windows according to an embodiment of the present disclosure.

Referring to FIG. 13, the method of managing the tab windows includes operations that are time-serially performed by the device 2200 of FIG. 22 or 23. Thus, although omitted below, a description of the device 2200 of FIG. 22 or 23 that will be described later may apply to the method of managing the tab windows of FIG. 13.

The flowchart of FIG. 13 includes the continuously processed operations of FIG. 10. In other words, the method of managing the tab windows of FIG. 13 includes operations that are performed when the tab windows are displayed on a terminal screen.

In operation S1840, the device 2200 executes an application included in one of the tab windows based on input information of a user. For example, the device 2200 may execute the application based on information regarding an object, which is selected by the user, for executing the application.

In operation S1850, the device 2200 receives a user input that moves an object indicating data included in the executed application to an application included in another tab window. In this regard, the user input is the same as described with reference to operation S1810 of FIG. 12 above. In other words, the user input may correspond to dragging and dropping an object indicating data included in one of the tab windows and moving the object to a point where the object of the application included in the other tab window is located. Alternatively, the user input may correspond to dragging and dropping the object indicating data included in one of the tab windows and moving an execution screen of the application displayed on the other tab window.

In operation S1860, the device 2200 executes the data in the application included in the other tab window according to the received user input. For example, if the data moved by the user input is a music reproduction file, and the application included in the other tab window is a music reproduction application, the device 2200 reproduces the moved music reproduction file.

In operation S1870, the device 2200 outputs an execution screen of the executed application on the terminal screen. In more detail, an execution screen according to reproduction of music is output on the other tab window (i.e., the tab window including the music reproduction application) in the example described above.

Hereinafter, the method of managing the tab windows described with reference to FIGS. 12 and 13 above (in more detail, a method of moving an application or data from one tab window to another tab window) will now be described with reference to FIGS. 14A to 14C.

Figure 14A:
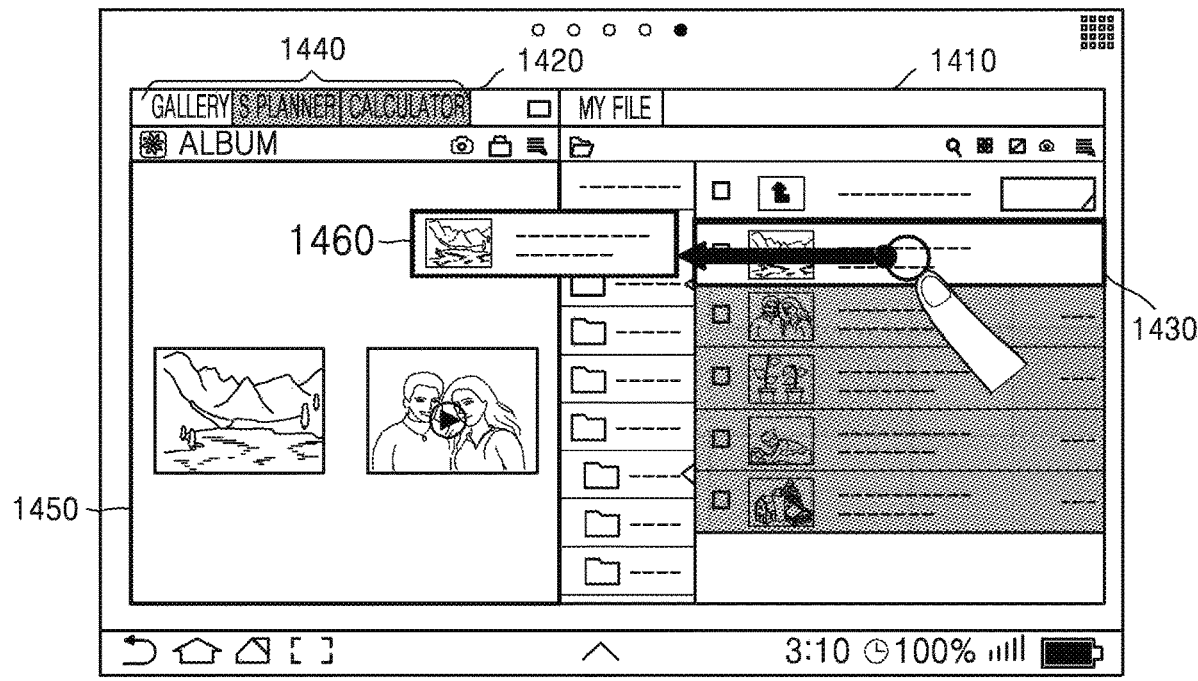
FIGS. 14A to 14C illustrate examples in which a device moves data included in one tab window to another tab window according to various embodiments of the present disclosure.
Figure 14B:
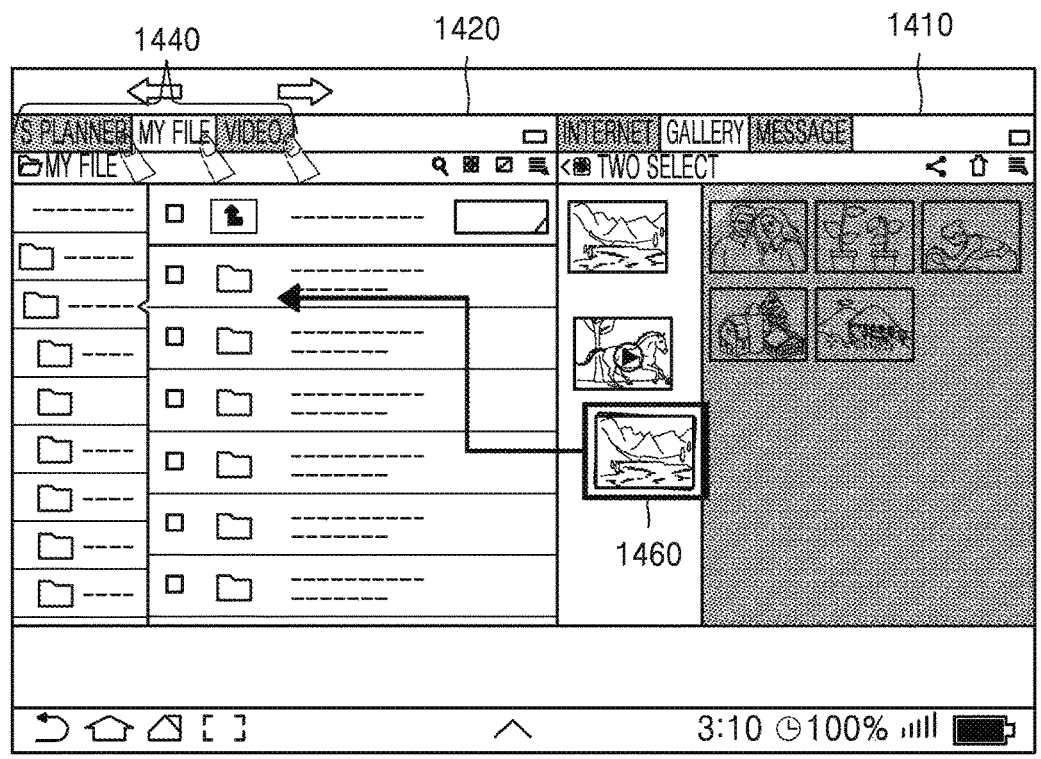
Figure 14C:
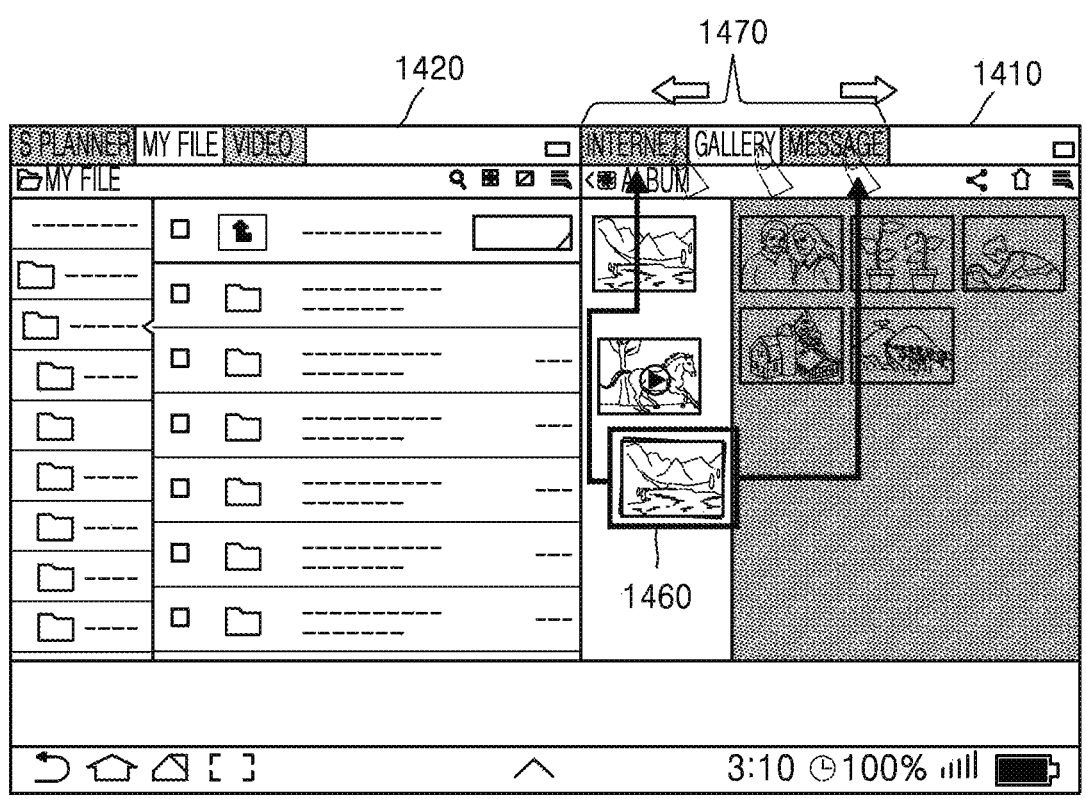

FIGS. 14A to 14C illustrate examples in which the device 2200 moves data included in one of tab windows 1410 and 1420 to the other of the tab windows 1410 and 1420 according to various embodiments of the present disclosure.

Referring to FIGS. 14A and 14B, an example of moving data of an application included in the tab window 1410 to the tab window 1420 is illustrated. Referring to FIG. 14C, an example of moving data between a plurality of applications included in the tab window 1410 is illustrated.

Although an example of the method of moving data described with reference to FIG. 13 above is illustrated in FIGS. 14A to 14C, the example may apply to the method of moving an application described with reference to FIG. 12 above. In other words, a mechanism of moving data that will be described with reference to FIGS. 14A to 14C is the same as that of moving the application described with reference to FIG. 12 above. Thus, a detailed description of the method of moving the application will not be repeated hereinafter.

Referring to FIG. 14A, a user performs an input that executes an application included in the tab window 1410. In this regard, a method in which the user executes the application is the same as described above.

Thereafter, the user performs an input that moves an object 1430 indicating data included in the executed application to an application included in the tab window 1420. For example, the user may drag and drop the object 1430 to the location of objects 1440 indicating titles of applications displayed on the tab window 1420 or may drag and drop the object 1430 on an execution screen 1450 of the application displayed on the tab window 1420.

In this regard, the dragging and dropping may correspond to converting the object 1430 into a floating object 1460 if the user long presses the object 1430 and dragging and dropping the floating object 1460 to the location of objects 1440 indicating the titles of the applications or the execution screen 1450 of the application.

The device 2200 executes data corresponding to the object 1460 moved according to a received user input (for example, drag and drop) in the application included in the tab window 1420. The device 2200 outputs an execution screen of the executed application on the terminal screen. For example, if the moved data is a photo file, and the application included in the tab window 1420 is an image viewer, the device 2200 outputs a photo on an execution screen of the image viewer.

Referring to FIG. 14B, an example in which the user simultaneously performs an input that moves the object 1460 indicating the data included in the application executed in the tab window 1410 to the application included in the tab window 1420 and an input that changes an application that is to be executed among applications included in the tab window 1420 is illustrated.

In more detail, the user may touch one of the objects 1440 indicating the titles of the applications included in the tab window 1420 with the user's other hand while long pressing an object indicating the data included in the application executed in the tab window 1410 and converting the object into the floating object 1460 with user's hand Thus, the user may freely select one of the applications having an object to be moved and included in the tab window 1420.

Referring to FIG. 14C, an example in which the device 2200 moves data within the same tab window 1410 is illustrated. The user may drag and drop the object 1430 indicating the data to objects 1470 indicating the applications included in the tab window 1410.

For example, if an application currently executed in the tab window 1410 is an album application, the user may long press an object indicating a specific photo on an execution screen displayed on the tab window 1410 and convert the object into the floating object 1460. Thereafter, the user drags and drops the floating object 1460 to a location of one of the objects 1470 indicating the applications. Thereafter, the device 2200 moves the photo selected based on a user's drag and drop to another application of the album application.

As described above, the user may move an application or data that belongs to one of a plurality of tab windows to another tab window. The application or the data may be moved within one tab window. According to various embodiments, a tab window may include an application group including heterogeneous applications. Thus, the user may freely move data between the heterogeneous applications. The user may freely move the application or the data between the tab windows including the heterogeneous applications.

Figure 15A:
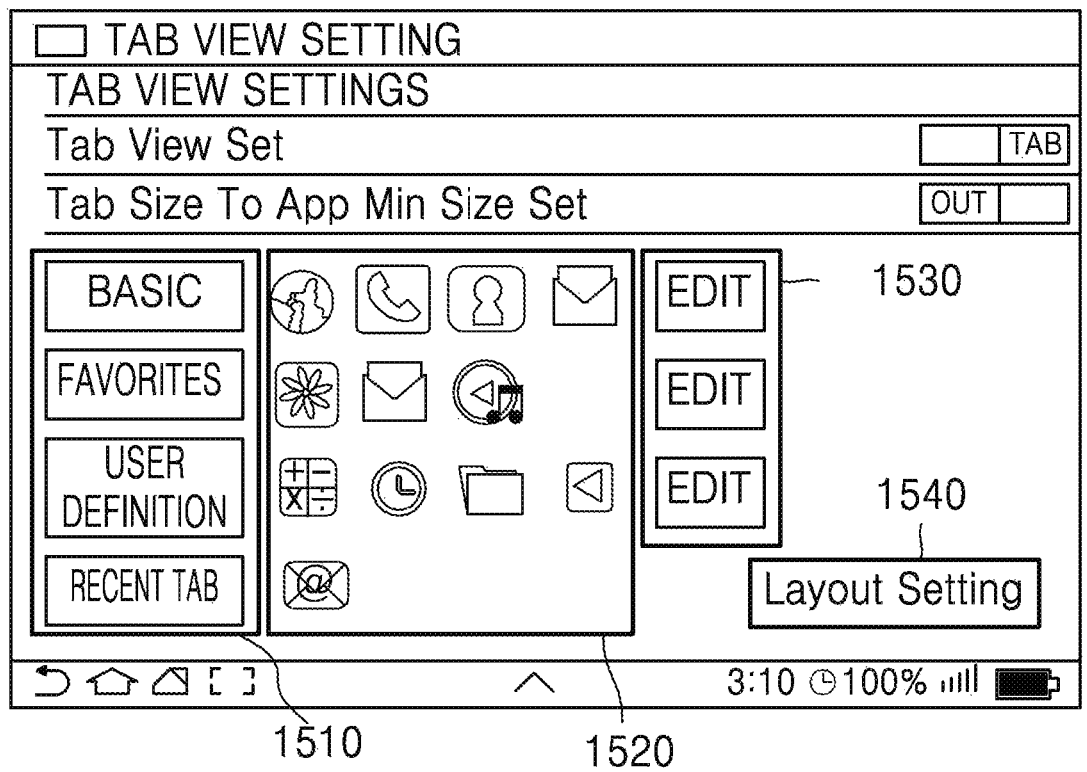
FIGS. 15A to 15C illustrate examples in which a device sets or changes environments of tab windows according to various embodiments of the present disclosure.
Figure 15B:
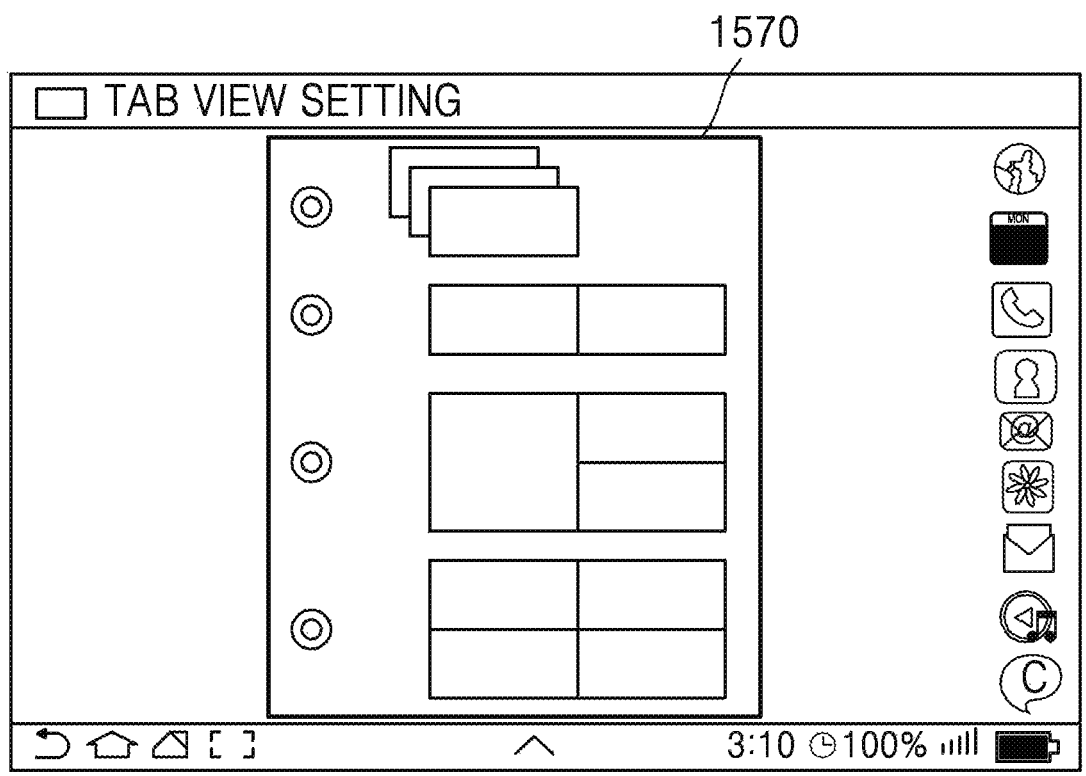
Figure 15C:
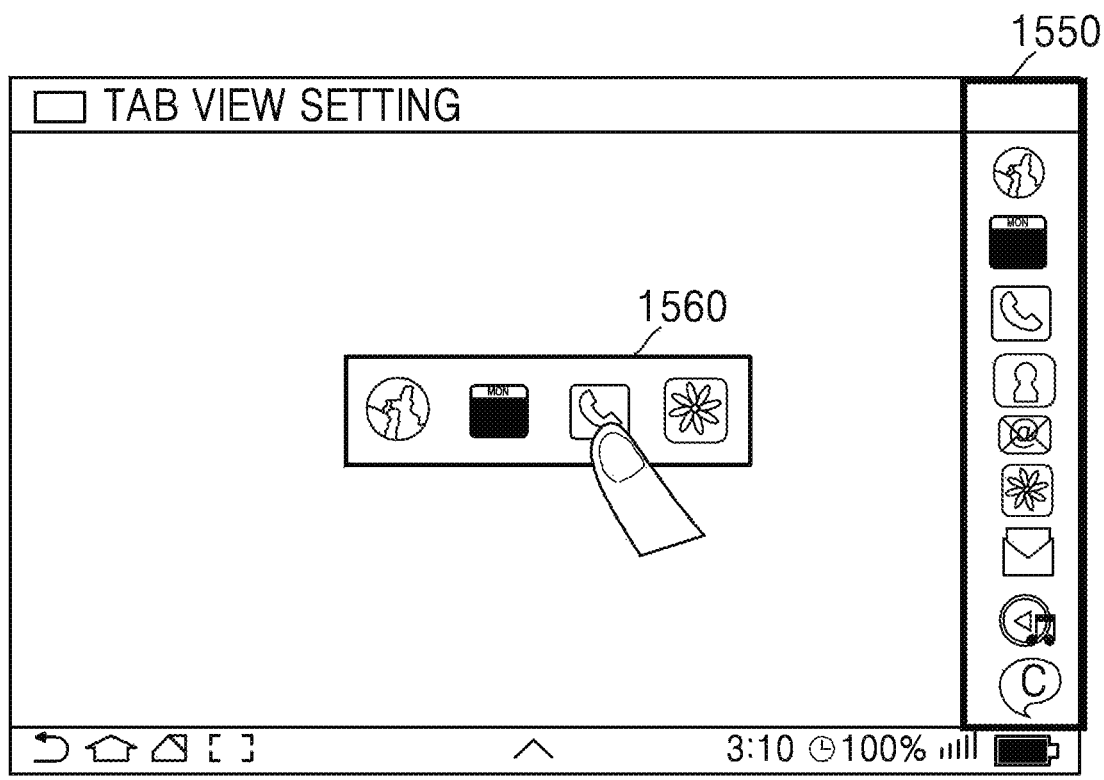

FIGS. 15A to 15C illustrate examples in which a device sets or changes environments of tab windows according to various embodiments of the present disclosure.

A screen for setting the environments of the tab windows is illustrated in FIG. 15A. Titles 1510 of currently generated tab windows and objects 1520 indicating applications included in each of the tab windows may be displayed on one region of the screen. Objects 1530 for editing (i.e. inserting or deleting) the applications included in the generated tab windows and an object 1540 for changing a layout of the tab windows may be displayed on another region of the screen.

Therefore, a user may select the objects 1530 for editing the applications, thereby freely editing the applications included in the tab windows. The user may select the object 1540 for changing the layout of the tab windows, thereby freely changing a shape of an alignment of the plurality of tab windows.

A screen for editing the applications included in the tab windows is illustrated in FIG. 15B. Objects 1550 indicating applications currently installed in a terminal may be displayed on one region of the screen. Objects 1560 indicating the applications included in the tab windows may be displayed on another region of the screen.

The user may drag and drop one of the objects 1550 indicating the applications currently installed in the terminal and move the object to a region that displays the objects 1560 indicating the applications included in the tab windows, thereby inserting the application corresponding to the selected object. The user may drag and drop one of the objects 1560 indicating the applications included in the tab windows and move the object to a region that displays the objects 1550 indicating the applications currently installed in the terminal, thereby deleting the application corresponding to the selected object.

A screen for setting the layout of the tab windows is illustrated in FIG. 15C. When the plurality of tab windows are selected on one region of the screen, forms 1570 for aligning the tab windows may be displayed on the screen of the terminal. The user may select one of the forms 1570 displayed on the screen, thereby determining a shape of an alignment of the plurality of tab windows on the screen of the terminal.

In accordance with the descriptions provided with reference to FIGS. 1 to 15C above, the tab window according to various embodiments is a tab view but is not limited thereto. The tab window may be any form indicting applications groups including a plurality of heterogeneous applications without limitation. As an example, the tab window according to various embodiments will be described as the tab view with reference to FIGS. 16A to 21B below.

The methods of managing the tab windows described with reference to FIGS. 1 to 15C apply to various embodiments that will be described later with reference to FIGS. 16A to 21B. In other words, although forms or configurations of the tab windows of FIGS. 1 to 15C and those of FIGS. 16A to 21B are merely different, the methods described with reference to FIGS. 1 to 15C apply to various embodiments that will be described later with reference to FIGS. 16A to 21B.

Figure 16A:
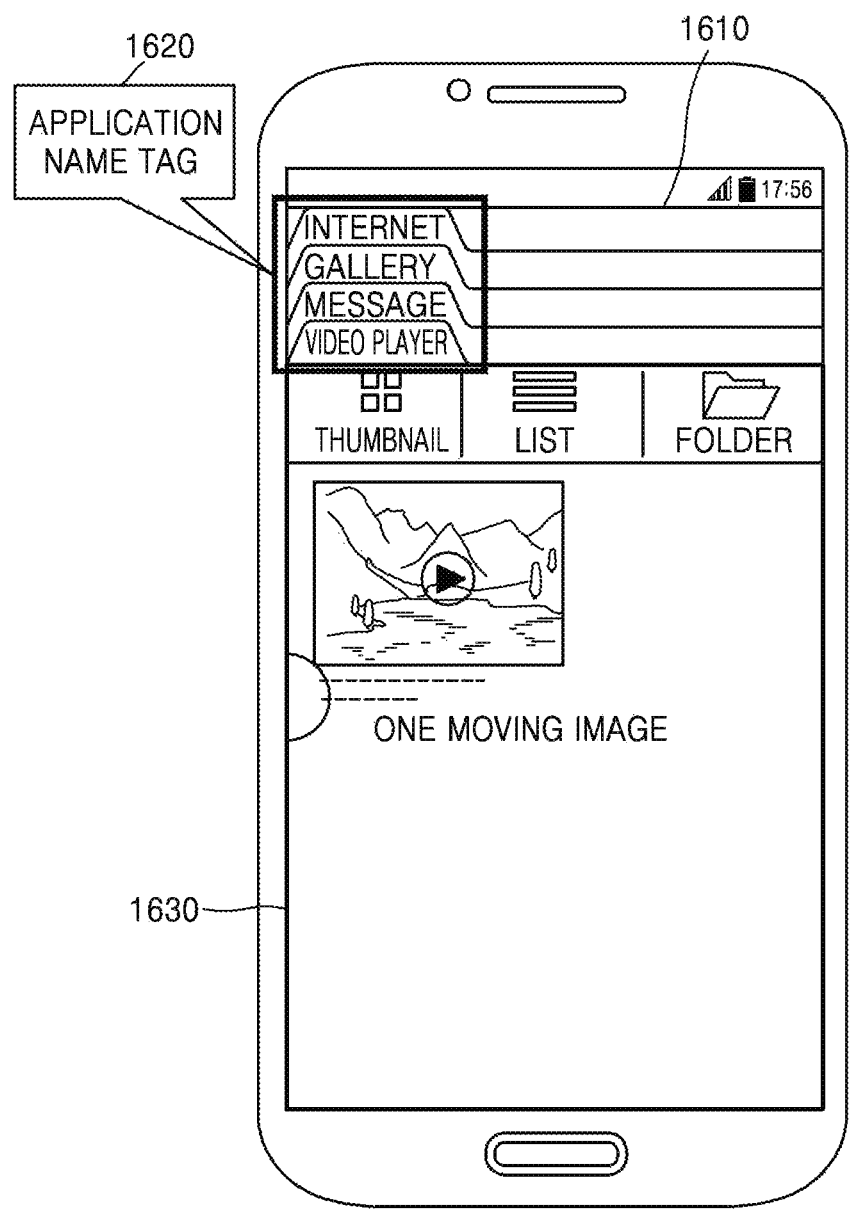
FIGS. 16A and 16B illustrate examples in which a device outputs a tab window on a terminal screen in a card view form according to various embodiments of the present disclosure.
Figure 16B:
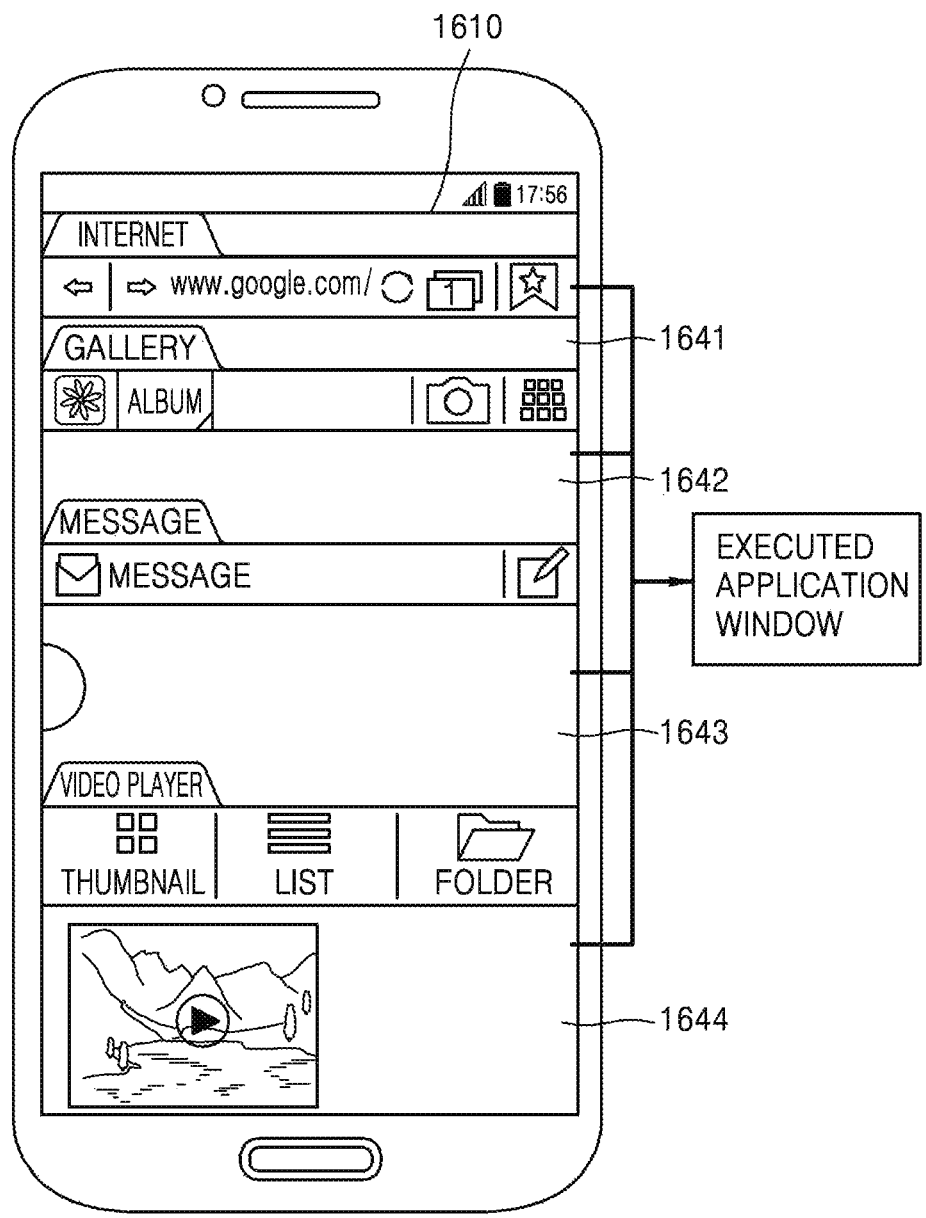

FIGS. 16A and 16B illustrate examples in which the device 2200 outputs a tab window 1610 on a terminal screen in a card view form according to various embodiments of the present disclosure.

Referring to FIG. 16A, the tab window 1610 in the card view form is displayed on the terminal screen. Titles of applications included in the tab window 1610 may be displayed 1620 on a predetermined region of the tab window 1610. When one of the applications included in the tab window 1610 is executed, the device 2200 may display an execution screen 1630 of the executed application at the very front.

Referring to FIG. 16B, a plurality of applications may be executed among the applications included in the tab window 1610. In this case, the device 2200 may split the tab window 1610 and display execution screens 1641, 1642, 1643, and 1644 of the executed applications.

Figure 17A:
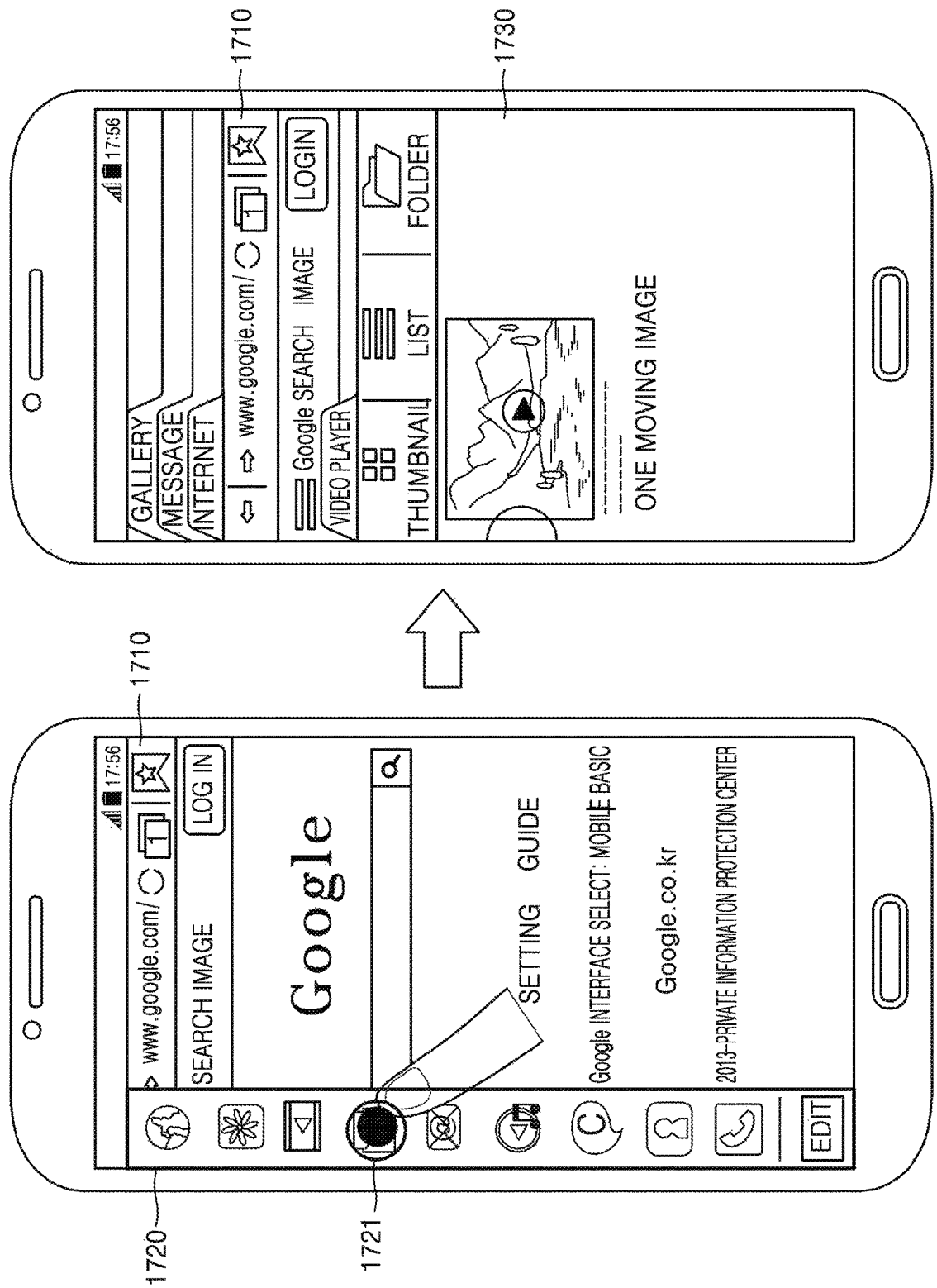
FIGS. 17A and 17B illustrate examples in which a device executes a tab window in a card view form when an application is executed according to various embodiments of the present disclosure.
Figure 17B:
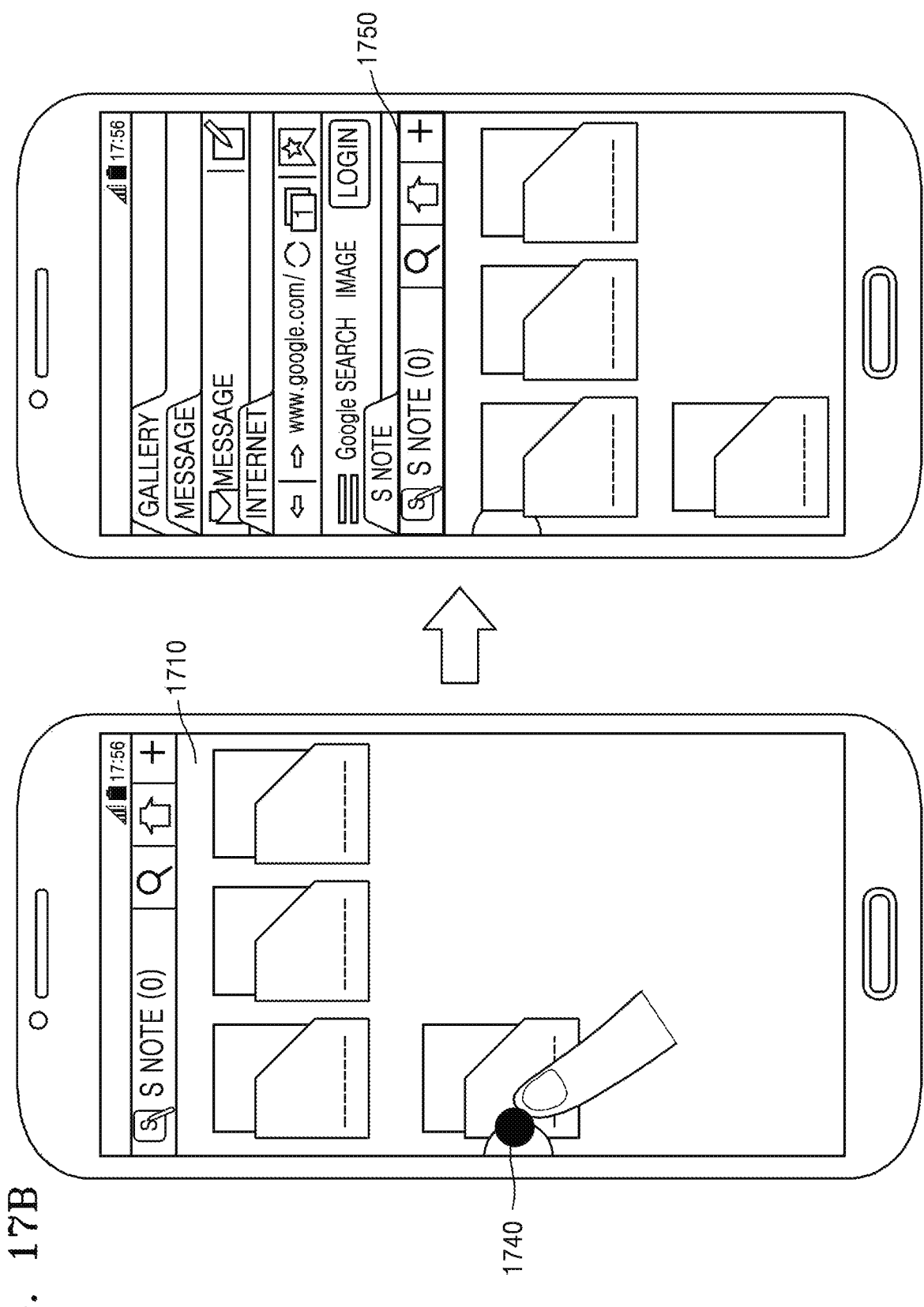

FIGS. 17A and 17B illustrate examples in which the device 2200 executes a tab window in a card view form when an application is executed according to various embodiments of the present disclosure.

Referring to a left figure of FIG. 17A, an execution screen 1710 of the application is displayed on a terminal screen. In this case, a user may select an object 1721 included in an application tray 1720 that is displayed on a predetermined region of the terminal screen. In this regard, the object 1721 is an object indicating one of applications installed in a terminal. For example, the user may select the object 1721 by touching the object 1721 included in the application tray 1720.

Referring to a right figure of FIG. 17A, the device 2200 receives selection information of the user and executes the application indicated by the selected object 1721. The device 2200 adds the application executed by a user's selection to an application group including a previously executed application. That is, the device 2200 generates the tab window including the two executed applications.

The device 2200 outputs the generated tab window on the terminal screen in the card view form. In other words, the device 2200 may output the execution screen 1710 of the previously executed application and an execution screen 1730 of the application executed by the user's selection as the tab window in the card view form.

Referring to a left figure of FIG. 17B, the execution screen 1710 of the application is displayed on the terminal screen. In this regard, it is assumed that the application that displays the execution screen 1710 is included in a predetermined application group. In this case, the user may select a tray handle 1740 displayed on a predetermined region of the terminal screen. For example, the user may select the tray handle 1740 by touching the tray handle 1740.

Referring to a right figure of FIG. 17B, the device 2200 receives selection information of the user and displays the tab window indicating an application group including the application that displays the execution screen 1710 on the terminal screen. In this regard, the tab window may be displayed on the terminal screen in the card view form, and the device 2200 may display an execution screen 1750 (of the left figure of FIG. 17B) of a most recently executed application on the terminal screen at the very front.

Figure 18A:
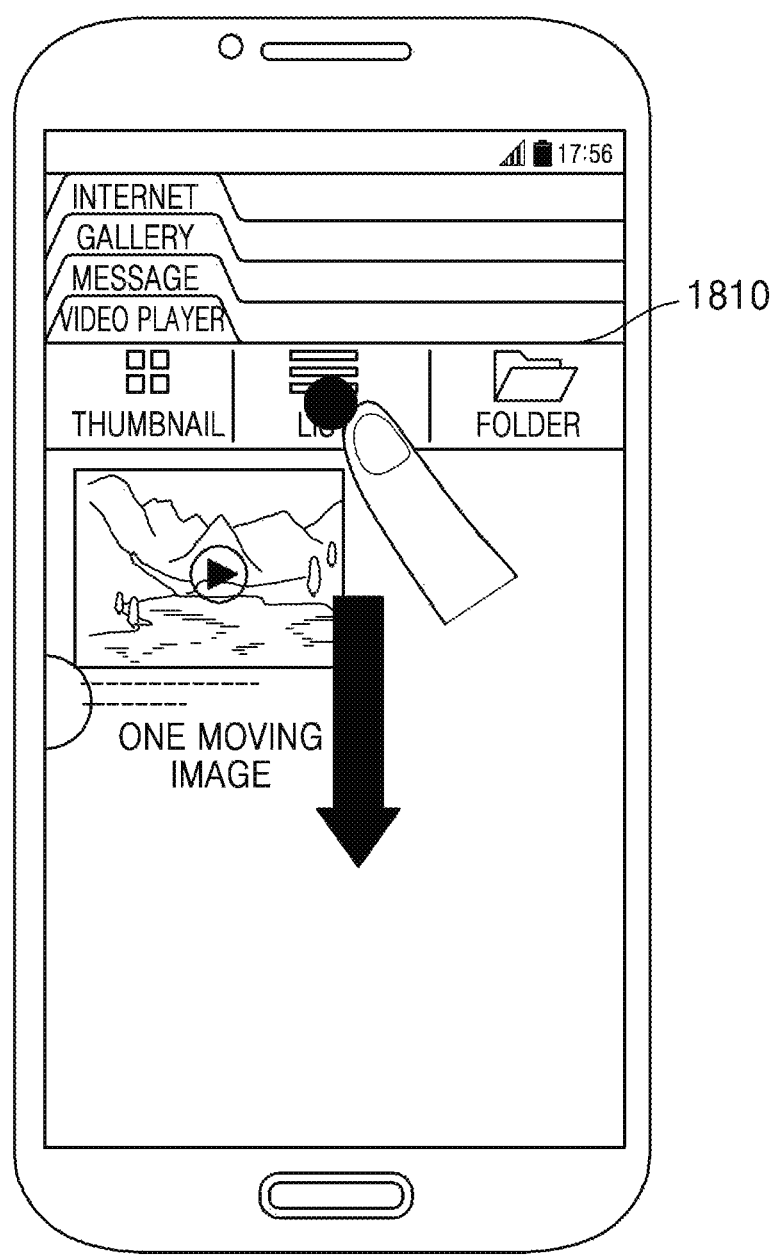
FIGS. 18A to 18C illustrate examples in which a device manages a tab window in a card view form based on a user input of up and down scrolling according to various embodiments of the present disclosure.
Figure 18B:
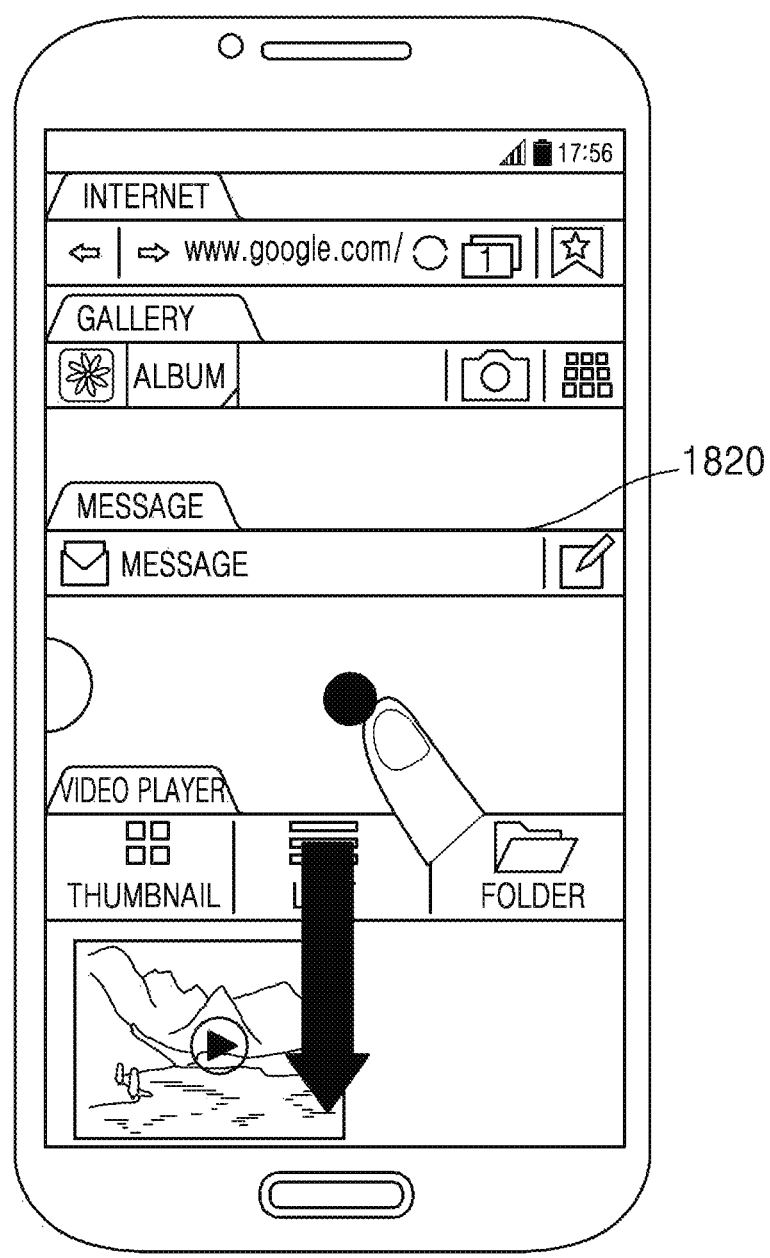
Figure 18C:
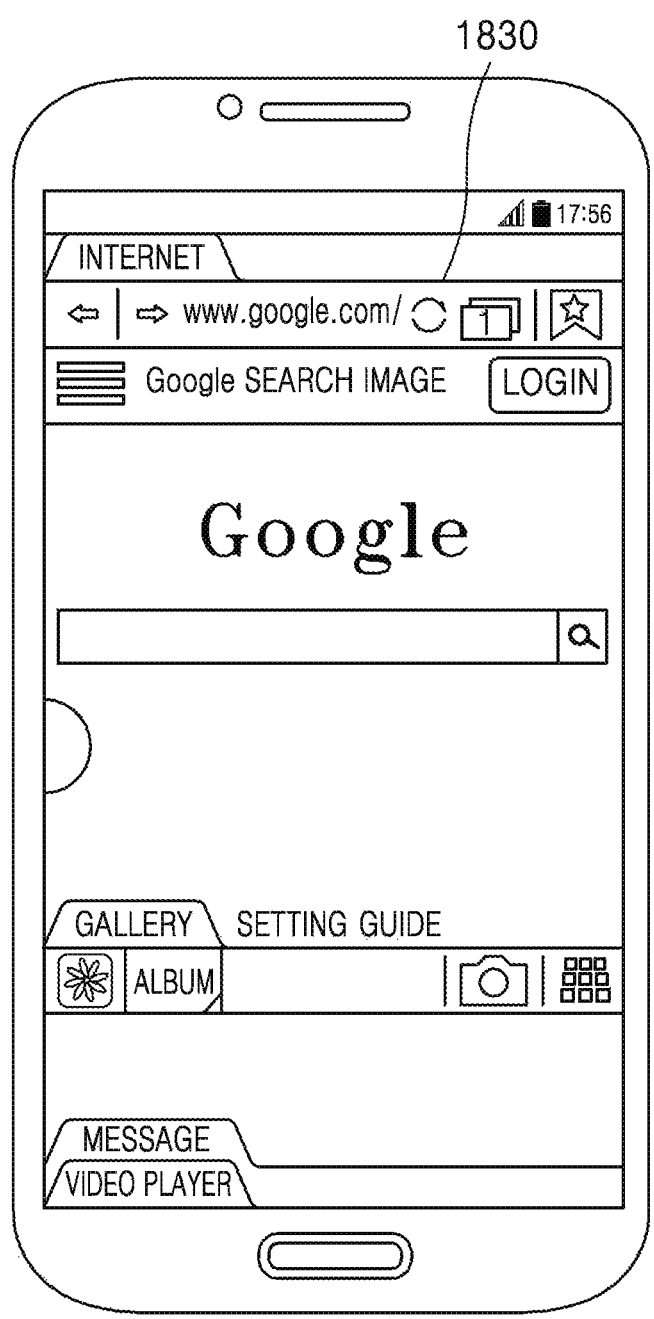

FIGS. 18A to 18C illustrate examples in which the device 2200 manages a tab window in a card view form based on a user input of up and down scrolling according to various embodiments of the present disclosure.

Referring to FIGS. 18A to 18C, a process in which the device 2200 changes a display form of the tab window based on the user input of up and down scrolling is illustrated.

Referring to FIG. 18A, the tab window in the card view form is output on a terminal screen. In this case, a user may scroll down an execution screen 1810 displayed at the very front. In this regard, scrolling refers to a gesture that the user continuously touches the terminal screen in a specific direction while touching the execution screen 1810.

The device 2200 moves and displays the execution screen 1810 in a scroll direction (i.e. in a lower direction) based on the user scroll input. In this regard, the device 220 may differently display a region of an execution screen 1810 according to intensity, time, or a distance of the scroll input.

Referring to FIG. 18B, the user may scroll an execution screen 1820 displayed on the tab window in the lower direction. The device 2200 moves and displays the execution screen 1820 in a scroll direction based on the user scroll input.

Referring to FIG. 18C, an execution screen 1830 of an application at the very rear of the tab window is displayed on a center of the terminal screen. That is, when a plurality of applications are included in the tab window, the user repeatedly performs the operations described with reference to FIGS. 18A and 18B, thereby displaying an execution screen of a desired application on the center of the terminal screen. The user adjusts scroll intensity, tile, and distance, thereby freely adjusting a size of an execution screen of an application.

FIGS. 19A to 19D illustrate examples in which the device 2200 manages a tab window in a card view form based on a user input of up and down and left and right scrolling according to various embodiments of the present disclosure.

Referring to FIGS. 19A to 19D, a process in which the device 2200 changes a display form of the tab window based on the user input of up and down and left and right scrolling is illustrated. In this regard, user scrolling is the same as described with reference to FIG. 18A.

Figure 19A:
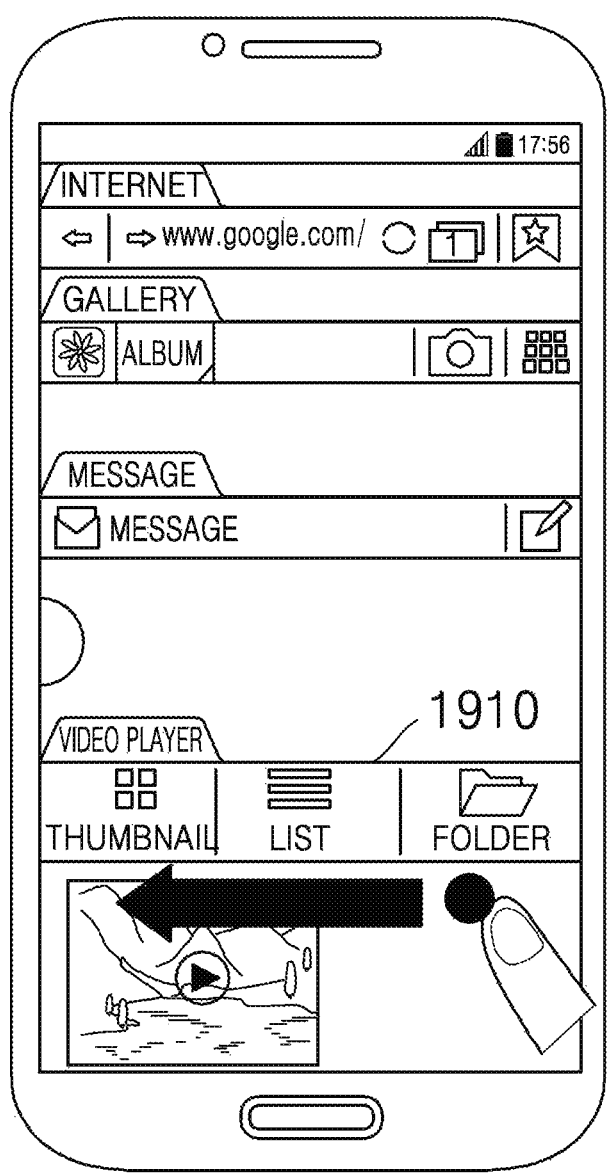
FIGS. 19A to 19D illustrate examples in which a device manages a tab window in a card view form based on a user input of up and down and left and right scrolling according to various embodiments of the present disclosure.

Referring to FIG. 19A, the tab window in the card view form is output on a terminal screen. In this case, a user may scroll an execution screen 1910 of a specific application in a left or right direction.

Figure 19B:
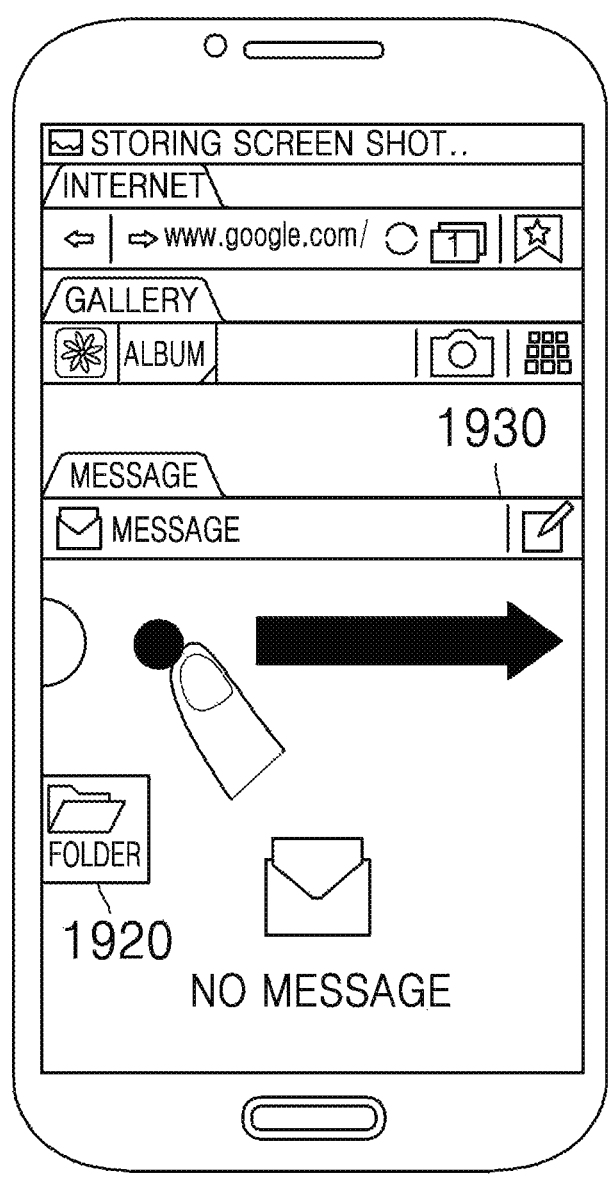

Referring to FIG. 19B, the device 2200 displays a part 1920 of the scrolled execution screen 1910 on the terminal screen based on the user scroll input. In this case, the user may scroll an execution screen of another application in the left or right direction.

Figure 19C:
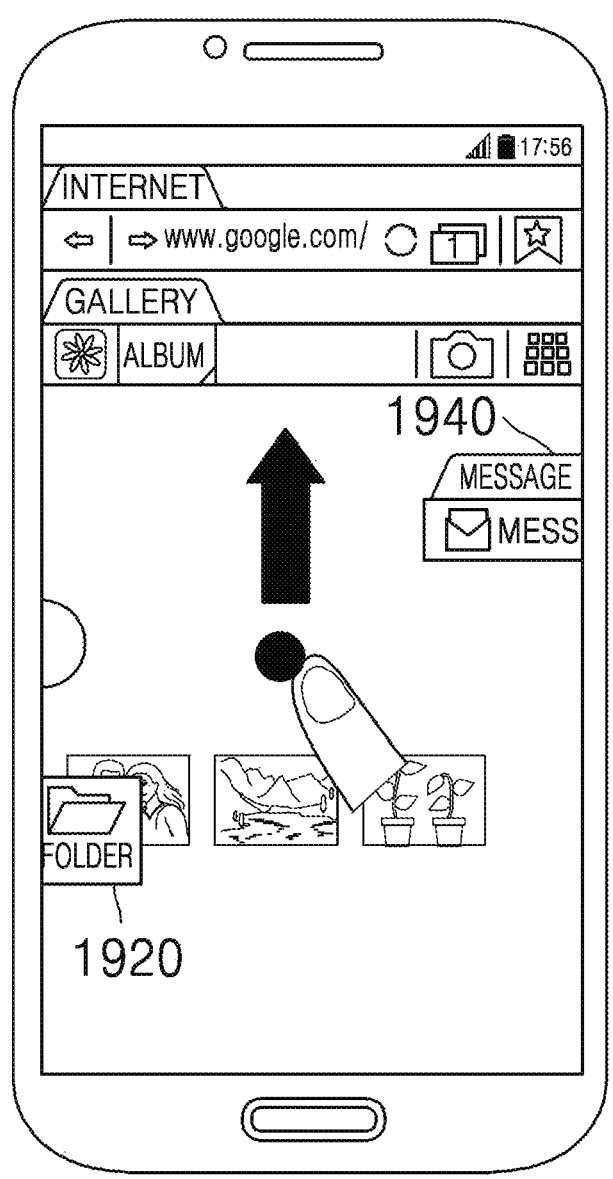

Referring to FIG. 19C, the device 2200 displays a part 1940 of the scrolled execution screen 1930 on the terminal screen based on the user scroll input. In this case, the user may scroll an execution screen 1950 of another application in an upper or lower direction.

Figure 19D:
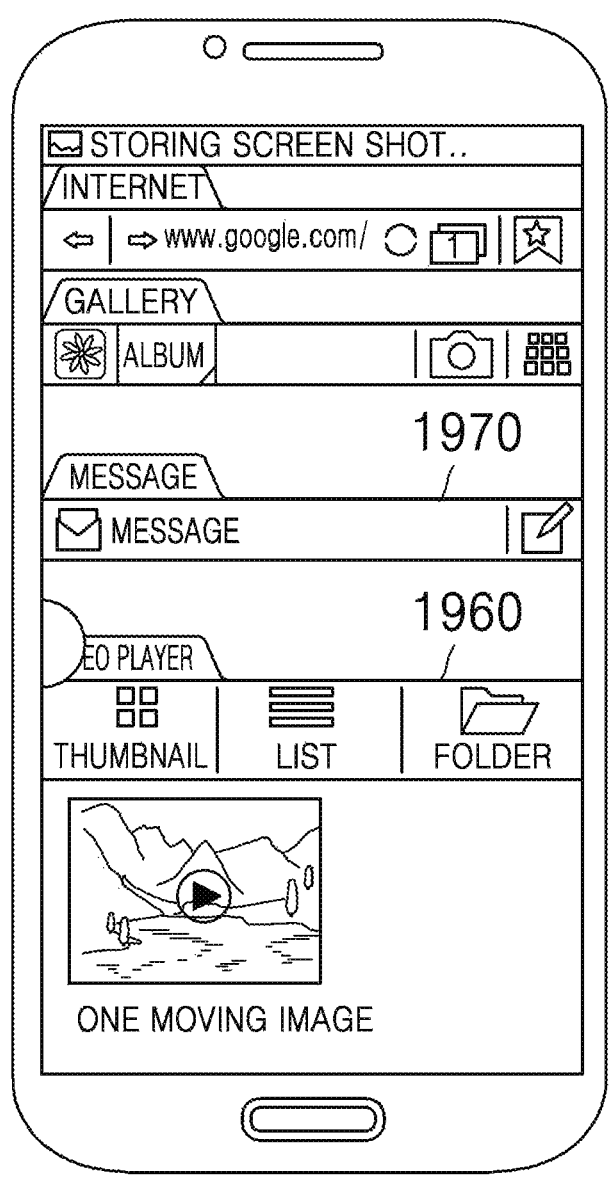

Referring to FIG. 19D, the device 2200 displays the execution screens on original locations 1960 and 1970 based on the user scroll input.

Figure 20B:
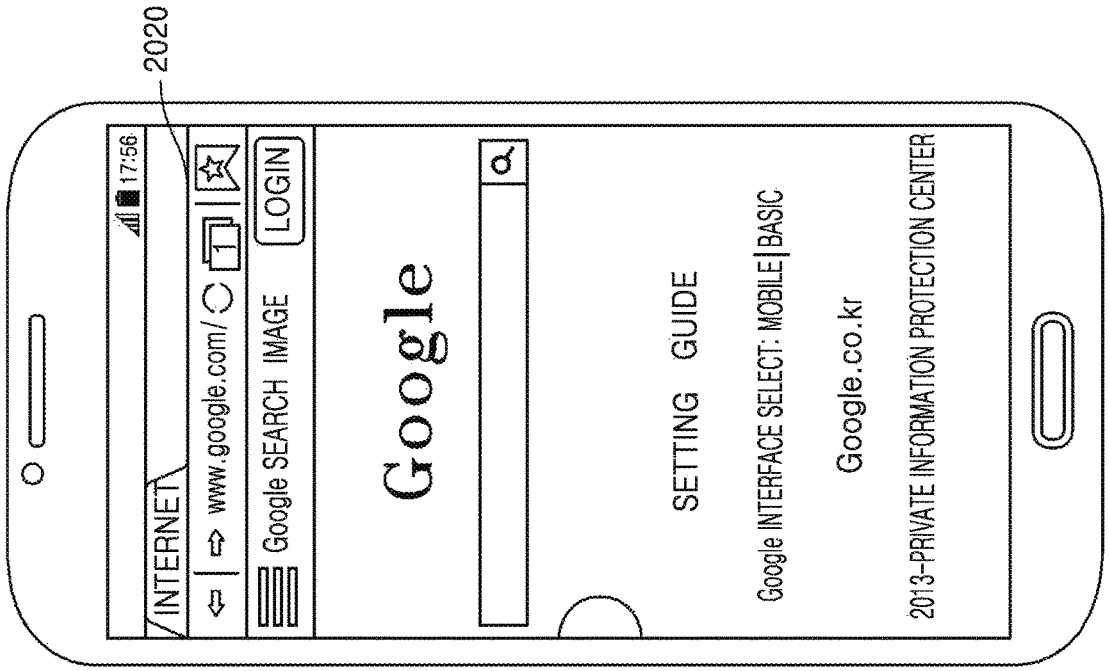
FIGS. 20A and 20B illustrate examples in which a device converts execution screens of applications included in a tab window in a card view form according to various embodiments of the present disclosure.
Figure 20A:
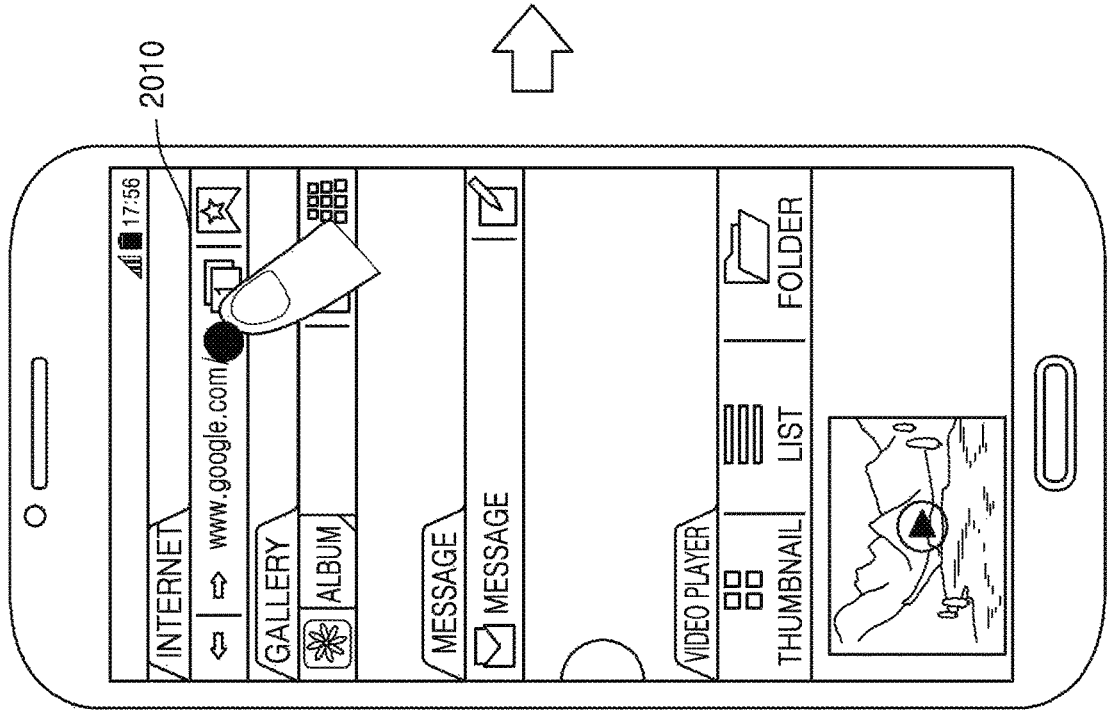

FIGS. 20A and 20B illustrate examples in which the device 2200 converts execution screens of applications included in a tab window in a card view form according to various embodiments of the present disclosure.

In accordance with the descriptions provided with reference to FIGS. 18A to 19D, the execution screens of the applications included in the tab window are displayed on a predetermined region of the terminal screen. In other words, the device 2200 may display the execution screens on the terminal screen by changing locations and regions of the execution screens based on the user scroll input, whereas the device 220 may not display an execution screen of an application on the entire terminal screen. However, in accordance with a description that will be provided with reference to FIGS. 20A and 20B below, the device 2200 may display an execution screen of a specific application on the entire terminal screen.

Referring to FIGS. 20A and 20B, a process in which the device 2200 converts the execution screens of the tab window based on a user gesture input is illustrated.

Referring to FIG. 20A, the tab window in the card view is output on the terminal screen. In this case, a user may touch an execution screen 2010 of a specific application.

Referring to FIG. 20B, the device 2200 displays an execution screen 2020 of an application touched based on a user touch input on the entire terminal screen. Thus, even if a plurality of applications included in the tab window are executed, the device 2200 may display an execution screen of an application desired by the user on the entire terminal screen.

FIGS. 21A and 21B illustrate examples in which the device 2200 manages a tab window in a card view form based on a user input of a long touch gesture according to various embodiments of the present disclosure.

Referring to FIGS. 21A and 21B, a process in which the device 2200 converts execution screens of the tab window based on the user gesture input is illustrated.

Referring to FIG. 21A, the tab window in the card view form is output on a terminal screen. In this case, a user may long touch an execution screen 2110 of a specific application. In this regard, long touch refers to a gesture that continuously touches a same point during a predetermined period of time.

Referring to FIG. 21B, the device 2200 displays an execution screen 2120 of an application touched based on the user long touch input on a partial region of the terminal screen. The device 2200 displays an object 2130 indicating a list of other applications included in the tab window on another region of the terminal screen.

Therefore, even if a plurality of applications included in the tab window are executed, the device 2200 may display an execution screen of an application desired by the user on a wide region of the terminal screen. The device 2200 displays a list of other applications included in the tab window on the terminal screen, thereby notifying the user about types of the applications included in the tab window.

In accordance with the descriptions provided with reference to FIGS. 16A to 21B, the tab window in the card view form corresponds to another form of a tab window in the tab view form described with reference to FIGS. 1 to 15C. Thus, although not described with reference to the figures, the method of moving the applications or the data described above may be performed in the same way. The device 2200 may apply the method of storing the information regarding the tab window described above to the tab window in the card view form in the same way.

FIG. 22 is a block diagram of elements of the device 2200 according to an embodiment of the present disclosure.

Referring to FIG. 22, the device 2200 according to various embodiments of the present disclosure includes an input unit 2210, a group generating unit 2220, an execution unit 2230, a frame changing unit 2240, an output unit 2250, a control unit 2260, and a storage unit 2270.

The device 2200 of FIG. 22 includes elements for performing the methods of managing the tab windows described with reference to FIGS. 1 to 21B. Thus, although omitted below, the descriptions provided with reference to FIGS. 1 to 21B may apply to the elements of FIG. 22.

The input unit 2210 receives a user input to the device 2200. A user may perform a gesture of touching a predetermined location on a terminal screen. The input unit 2210 may receive the user input according to the user gesture. The input unit 2210 may receive the user input by using an input tool such as a keypad of a terminal, a keyboard and a mouse that are connected to the terminal, and a stylus. The input unit 2210 may determine which part of which tab window the user has touched based on the location of the terminal screen touched by the user. For example, the input unit 2210 may determine whether an object (for example, an icon) for displaying a list of applications has been touched on a tab window.

The group generating unit 2220 generates an application group including an application corresponding to the selected object according to the received user input. In this regard, the application group refers to a set of applications included in one tab window.

The application group may include a plurality of heterogeneous applications. For example, the heterogeneous applications include applications having different execution objects or applications which are different in processes for executing the applications.

The execution unit 2230 executes the applications included in the tab window according to the user input. When a plurality of tab windows are output on the terminal screen, and the input unit 2210 receives a user input to execute applications included in each of the tab windows, the execution unit 2230 may simultaneously or sequentially perform the applications according to the user input.

The execution unit 2230 may execute the application included in one of the tab windows, and execute data included in the executed application in the application included in another tab window. A detailed description of the operation of the execution unit 2230 is the same as described with reference to FIGS. 12 to 14C above, and thus the description thereof will not be repeated here.

The frame changing unit 2240 changes locations of the tab windows according to the user input or reduces or increases regions thereof. A detailed description of the operation of the frame changing unit 2240 is the same as described with reference to FIGS. 8 to 9C above, and thus the description thereof will not be repeated here.

The output unit 2250 outputs a display window including at least one or more objects on the terminal window. The output unit 2250 may output the tab window indicating the application group on the terminal screen. The output unit 2250 may output the tab windows on the terminal screen. In more detail, the output unit 2250 may output another tab window on a second region distinguished from a first region that displays one tab window on the terminal screen.

The output unit 2250 may output an execution screen of the application executed by the execution unit 2230 on the terminal screen. In more detail, the output unit 2250 may output an execution screen of the application included in the tab window on the terminal screen. In this regard, the execution screen may be displayed on at least a part of a region of the terminal screen that displays the tab window.

The output unit 2250 may reflect the locations or regions of the tab windows changed by the frame changing unit 2240 and output the changed tab windows on the terminal screen.

The storage unit 2270 stores information regarding the tab windows. In this regard, the information regarding the tab windows includes a list of the applications included in the application group or the regions of the tab windows. In more detail, the storage unit 2270 stores information regarding the applications included in the application group or locations and sizes of the tab windows displayed on the terminal screen.

When an application or data included in one of the tab windows is moved to another tab window, the storage unit 2270 may renew and store the information regarding the tab windows based on the moved application or data.

The storage unit 2270 may store the locations and the regions of the tab windows at a time when execution of the tab windows is terminated. The storage unit 2270 may store types (for example, titles) of the applications displayed on the tab windows and execution screens of the applications at the time when execution of the tab windows is terminated.

The control unit 2260 controls the input unit 2210, the group generating unit 2220, the execution unit 2230, the frame changing unit 2240, the output unit 2250, the control unit 2260, and the storage unit 2270 to allow the device 2200 to perform various operations for managing the tab windows.

The input unit 2210, the group generating unit 2220, the execution unit 2230, the frame changing unit 2240, and the output unit 2250 may partially or wholly operate via a software module but are not limited thereto. A part of the input unit 1100 may operate via hardware.

At least a part of the input unit 2210, the group generating unit 2220, the execution unit 2230, the frame changing unit 2240, and the output unit 2250 may be included in the control unit 2260. The input unit 2210, the group generating unit 2220, the execution unit 2230, the frame changing unit 2240, the output unit 2250, and the control unit 2260 may operate via one processor but are not limited thereto.

FIG. 23 is a block diagram of an example of a window grouping management architecture 2300 used by a device to manage a tab window a according to an embodiment of the present disclosure.

Referring to FIG. 23, the architecture 2300 may include an application framework 2310 and a manager service 2320. The application framework 2310 may be present separately from the manager service 2320.

The architecture 2300 of FIG. 23 includes the elements for performing the methods of managing the tab windows described with reference to FIGS. 1 to 21B above. Thus, although omitted below, the descriptions provided with reference to FIGS. 1 to 21B may apply to the architecture 2300 of FIG. 23.

The application framework 2310 performs a request according to a user input and acts as a user interface (UI). In more detail, the application framework 2310 may include an application (app) list manager 2312, an app window manager 2314, and a tab window manager 2316.

The app list manager 2312 displays graphic images on a terminal screen by using values set by a tab set application described with reference to FIGS. 15A to 15C above. In more detail, the app list manager 2312 sets and manages an icon and a layout of an application group set by the tab set application and sizes of tab windows as a list.

When the app list manager 2312 receives an input to execute an application from a user, the app list manager 2312 requests a specific tab window to execute the application. In more detail, when the app list manager 2312 receives the input to execute the application, the app list manger 2312 requests the tab window to execute the application based on the set list.

When an interaction occurs in a tab or between tabs, the app window manager 2314 requests the manager service 2320 to perform an action corresponding to the occurred interaction. In more detail, when an event occurs, such as a location change of the tab window, resize (for example, reduction or expansion) of the tab window, drag and drop of an object indicating an application included in the tab window, a movement of the application or data, etc., the app window manager 2314 requests a tab history manager 2326 to renew stored information based on information regarding the occurred event.

The tab window manager 2316 acts as an interface that transmits all requests (for example, an UI, an event, etc.) according to a user input relating to the tab window from the app list manager or the app window manager 2314 to the manager service 2320.

The manager service 2320 renews information regarding the tab window according to a user request and moves the application or the data between the tab windows. In more detail, the manager service 2320 may include a tab status update manager 2322, a data interaction manager 2324, and a tab history manager 2326.

The tab status update manager 2322 transmits the information regarding the tab window received through the tab window manager 2316 to the tab history manager 2326. In more detail, the tab status update manager 2322 acquires the information regarding the tab window via the tab history manager 2326. When a status of the corresponding tab window is changed, the tab status update manager 2322 requests the tab history manager 2326 to renew the stored information. In this regard, a change in the tab window includes the location change of the tab window, the resize of the tab window, the drag and drop of the object indicating the application included in the tab window, the movement of the application or the data, etc.

When the movement of the application or the data is requested between the tab windows or in the tab windows, the data interaction manager 2324 floats the corresponding application or the data and moves the application or the data according to the user input. If the application or the data is completely moved, the data interaction manager 2324 notifies the tab history manager 2326 that the information regarding the tab window has been changed. The tab history manager 2326 is storage that stores and renews every piece of information regarding the tab windows. In this regard, the information regarding the tab windows includes an order of the tab windows, a list of the applications included in the tab windows, sizes of execution screens, locations of objects indicating the applications, etc. If the information regarding the tab windows is requested to be renewed according to a user input, the tab history manager 2326 renews the information regarding the corresponding tab window and transmits the renewed information to the application framework 2310.

The application framework 2310 outputs a change corresponding to the terminal screen by using the transmitted information.

A non-transitory computer-readable recording medium may be an arbitrary available medium accessible by a computer, and examples thereof include all volatile and non-volatile media and separable and non-separable media. Further, examples of the non-transitory computer-readable recording medium may include a computer storage medium. Examples of the computer storage medium include all volatile and non-volatile media and separable and non-separable medial, which have been implemented by an arbitrary method or technology, for storing information such as computer-readable commands, data structures, program modules, and other data.

It should be understood that the various embodiments described herein should be considered in a descriptive sense only and not for purposes of limitation. Descriptions of features or aspects within each embodiment should typically be considered as available for other similar features or aspects in other embodiments.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of application grouping performed by a device, the method comprising:
   including at least one first application selected based on a first input of a user into a first application group;
   including at least one second application selected based on a second input of the user into a second application group;
   displaying, based on a third input of the user, a first view indicating the first application group on a screen; and
   displaying, based on a fourth input of the user, a second view indicating the second application group on the screen using a stored location and a stored region of the second view and a stored execution screen of an application included in the second application group,
   wherein the including of the at least one first application selected based on the first input of the user into the first application group comprises:
      while the first view is displayed on the screen:
         displaying an application tray including icons for executing applications installed in the device on the screen,
         selecting, based on the first input of the user, one of the icons included in the application tray,
         including an application corresponding to the selected icon into the first application group and into a title bar of the first application group, and
         displaying an execution screen of the application corresponding to the selected icon on at least partial region of the first view based on converting a previous execution screen into the execution screen of the application corresponding to the selected icon, and
   wherein the stored location and the stored region of the second view indicates a location and a region of the second view at time when the second view ends and the stored execution screen of the application included in the second application group indicates an execution screen displayed at the time when the second view ends.

2. The method of claim 1, wherein the first view comprises an execution screen of the at least one first application included in the first application group and the second view comprises an execution screen of the at least one second application included in the second application group.

3. The method of claim 1, wherein the first or second application group comprises a plurality of heterogeneous applications.

4. The method of claim 1, wherein the second input is an input of touching one of the icons included in the application tray.

5. The method of claim 1, wherein the including of the at least one second application selected based on the second input of the user into the second application group comprises:
   selecting, based on the second input of the user, a first application from among applications included in the first application group, and
   moving, based on a fifth input of the user on the first application, the first application from the first application group to the second application group.

6. The method of claim 1, wherein the including of the at least one second application selected based on the second input of the user into the second application group comprises:
   selecting, based on the second input of the user, a first application from among applications included in the first application group, and
   based on a fifth input of the user on the first application, creating the second application group, and moving the first application from the first application group to the second application group.

7. The method of claim 1, further comprising:
   storing information about the second view,
   wherein the information comprises a list of applications included in the second application group and information about execution screens of the applications.

8. The method of claim 7, wherein the displaying of the second view on the screen comprises displaying the second view on the screen based on the stored information.

9. The method of claim 1, further comprising:
arranging and displaying, in a line on one side of the screen, a plurality of objects indicating each of a plurality of views.

10. The method of claim 1, further comprising:
selecting a first application from among applications included in the second application group;
selecting data included in the first application; and
moving the selected data to a second application from among applications included in the second application group.

11. The method of claim 1, further comprising:
selecting, based on a fifth input of the user, a first application from among applications included in the second application group; and
displaying an entire execution screen of the first application for executing the first application on the screen.

12. The method of claim 1, further comprising:
displaying an object for displaying a view on an edge of the screen; and
while an execution screen of a first application is displayed on the screen, displaying, based on a fifth input of the user selecting the object for displaying a view, a view indicating an application group including the first application on the screen.

13. The method of claim 12, further comprising:
selecting, based on a sixth input of the user, a second application included in the application group; and
removing the view indicating the application group and displaying an entire execution screen of the second application on the screen.

14. The method of claim 1, the first view indicating the first application group on the screen is adjacent to the second view indicating the second application group on the screen.

15. A device comprising:
a memory storing one or more instructions; and
at least one processor configured to execute the one or more instructions to:
include at least one first application selected based on a first input of a user into a first application group,
include at least one second application selected based on a second input of the user into a second application group,
display, based on a third input of the user, a first view indicating the first application group on a screen, and
display, based on a fourth input of the user, a second view indicating the second application group on the screen using a stored location and a stored region of the second view and a stored execution screen of an application included in the second application group,
wherein, to include the at least one second application selected based on the second input of the user into the second application group, the at least one processor is further configured to:
while the second view is displayed on the screen:
display an application tray including icons for executing applications installed in the device on the screen,
select, based on the second input of the user, one of the icons included in the application tray,
include an application corresponding to the selected icon into the second application group and into a title bar of the first application group, and
display an execution screen of the application corresponding to the selected icon on at least partial region of the second view based on a conversion of a previous execution screen into the execution screen of the application corresponding to the selected icon, and
wherein the stored location and the stored region of the second view indicates a location and a region of the second view at time when the second view ends and the stored execution screen of the application included in the second application group indicates an execution screen displayed at the time when the second view ends.

16. The device of claim 15, wherein the first view comprises an execution screen of the at least one first application included in the first application group and the second view comprises an execution screen of the at least one second application included in the second application group.

17. The device of claim 15, wherein the first or second application group comprises a plurality of heterogeneous applications.

18. The device of claim 15, wherein, to include the at least one second application selected based on the second input of the user into the second application group, the at least one processor is further configured to:
select, based on the second input of the user, a first application from among applications included in the first application group, and
move, based on a fifth input of the user on the first application, the first application from the first application group to the second application group.

19. The device of claim 15, wherein, to include the at least one second application selected based on the second input of the user into the second application group, the at least one processor is further configured to:
select, based on the second input of the user, a first application from among applications included in the first application group, and
based on a fifth input of the user on the first application, create the second application group and move the first application from the first application group to the second application group.

20. A non-transitory machine-readable medium containing instructions, that when executed by at least one processor, cause the at least one processor to perform:
including at least one first application selected based on a first input of a user into a first application group;
including at least one second application selected based on a second input of the user into a second application group;
displaying, based on a third input of the user, a first view indicating the first application group on a screen; and
displaying, based on a fourth input of the user, a second view indicating the second application group on the screen using a stored location and a stored region of the second view and a stored execution screen of an application included in the second application group,
wherein the including of the at least one first application selected based on the first input of the user into the first application group comprises:
while the first view is displayed on the screen:
displaying an application tray including icons for executing applications installed in a device on the screen,
selecting, based on the first input of the user, one of the icons included in the application tray,
including an application corresponding to the selected icon into the first application group and into a title bar of the first application group, and displaying an execution screen of the application corresponding to the selected icon on at least partial region of the first view based on converting a previous execution screen into the execution screen of the application corresponding to the selected icon, and wherein the stored location and the stored region of the second view indicates a location and a region of the second view at time when the second view ends and the stored execution screen of the application included in the second application group indicates an execution screen displayed at the time when the second view ends.

\* \* \* \* \*